United States Patent
Flanders et al.

(10) Patent No.: US 8,635,411 B2
(45) Date of Patent: Jan. 21, 2014

(54) DATA PROCESSING APPARATUS AND METHOD FOR MANAGING COHERENCY OF CACHED DATA

(75) Inventors: William Henry Flanders, Austin, TX (US); Vikram Khosa, Austin, TX (US)

(73) Assignee: ARM Limited, Cambridge (GB)

( * ) Notice: Subject to any disclaimer, the term of this patent is extended or adjusted under 35 U.S.C. 154(b) by 265 days.

(21) Appl. No.: 13/137,062

(22) Filed: Jul. 18, 2011

(65) Prior Publication Data

US 2013/0024629 A1    Jan. 24, 2013

(51) Int. Cl.
*G06F 13/00* (2006.01)

(52) U.S. Cl.
USPC .................................. 711/146; 711/E12.033

(58) Field of Classification Search
None
See application file for complete search history.

(56) References Cited

U.S. PATENT DOCUMENTS

| | | |
|---|---|---|
| 4,412,285 A | 10/1983 | Neches et al. |
| 5,802,043 A | 9/1998 | Skillen et al. |
| 5,940,864 A | 8/1999 | Arimilli et al. |
| 5,950,226 A | 9/1999 | Hagersten et al. |
| 6,038,651 A | 3/2000 | VanHuben et al. |
| 6,065,077 A | 5/2000 | Fu |
| 6,081,874 A | 6/2000 | Carpenter et al. |
| 6,112,283 A * | 8/2000 | Neiger et al. ............... 711/146 |
| 6,275,909 B1 | 8/2001 | Arimilli et al. |
| 6,279,086 B1 | 8/2001 | Arimilli et al. |
| 6,314,500 B1 | 11/2001 | Rose |
| 6,343,347 B1 | 1/2002 | Arimilli et al. |
| 6,349,367 B1 | 2/2002 | Arimilli et al. |
| 6,351,791 B1 | 2/2002 | Freerksen et al. |
| 6,353,875 B1 | 3/2002 | Arimilli et al. |
| 6,405,290 B1 | 6/2002 | Arimilli et al. |
| 6,502,171 B1 | 12/2002 | Arimilli et al. |
| 6,519,649 B1 | 2/2003 | Arimilli et al. |
| 6,591,307 B1 | 7/2003 | Arimilli et al. |
| 6,721,856 B1 | 4/2004 | Arimilli et al. |
| 6,848,003 B1 | 1/2005 | Arimilli et al. |
| 6,889,254 B1 | 5/2005 | Chandra et al. |
| 6,910,062 B2 | 6/2005 | Arimilli et al. |
| 7,263,586 B1 | 8/2007 | Kapil |
| 7,272,688 B1 | 9/2007 | Glasco |
| 8,140,828 B2 * | 3/2012 | Shen et al. ..................... 712/30 |

(Continued)

OTHER PUBLICATIONS

International Search Report and Written Opinion of the International Searching Authority mailed Sep. 11, 2012 in PCT/GB2012/051167.

(Continued)

*Primary Examiner* — Edward Dudek, Jr.
*Assistant Examiner* — Sean D Rossiter
(74) *Attorney, Agent, or Firm* — Nixon & Vanderhye P.C.

(57) ABSTRACT

An interconnect having a plurality of interconnect nodes arranged to provide at least one ring, a plurality of caching nodes for caching data coupled into the interconnect via an associated one of said interconnect nodes, and at least one coherency management node for implementing a coherency protocol to manage coherency of the data cached by each of said caching nodes. Each coherency management node being coupled into the interconnect via an associated one of said interconnect nodes. When each caching node produces a snoop response for said snoop request, the associated interconnect node is configured to output that snoop response in one of said at least one identified slots. Further, each interconnect node associated with a caching node has merging circuitry configured, when outputting the snoop response in an identified slot, to merge that snoop response with any current snoop response information held in that slot.

17 Claims, 14 Drawing Sheets

(56) References Cited

U.S. PATENT DOCUMENTS

| | | |
|---|---|---|
| 2001/0021963 A1 | 9/2001 | Cypher |
| 2002/0087809 A1 | 7/2002 | Arimilli et al. |
| 2002/0112128 A1 | 8/2002 | Arimilli et al. |
| 2002/0129211 A1 | 9/2002 | Arimilli et al. |
| 2003/0009637 A1 | 1/2003 | Arimilli et al. |
| 2003/0048797 A1 | 3/2003 | Sandstrom |
| 2003/0163649 A1 | 8/2003 | Kapur et al. |
| 2004/0008719 A1 | 1/2004 | Ying |
| 2004/0044821 A1 | 3/2004 | Myers |
| 2004/0148463 A1 | 7/2004 | Brown et al. |
| 2004/0199722 A1* | 10/2004 | Dodson et al. ............ 711/118 |
| 2004/0230752 A1* | 11/2004 | Blake et al. ............... 711/147 |
| 2005/0128950 A1 | 6/2005 | Hall et al. |
| 2005/0216672 A1 | 9/2005 | Gschwind et al. |
| 2005/0240735 A1 | 10/2005 | Shen et al. |
| 2006/0087985 A1 | 4/2006 | Kakivaya et al. |
| 2006/0179253 A1 | 8/2006 | Fields, Jr. et al. |
| 2006/0184750 A1* | 8/2006 | Blake et al. ............... 711/147 |
| 2006/0190636 A1 | 8/2006 | Daly, Jr. et al. |
| 2006/0224835 A1 | 10/2006 | Blumrich et al. |
| 2006/0236037 A1 | 10/2006 | Guthrie et al. |
| 2006/0265553 A1 | 11/2006 | Arimilli et al. |
| 2007/0011408 A1* | 1/2007 | Shen et al. ............... 711/146 |
| 2007/0162701 A1 | 7/2007 | Schlansker et al. |
| 2007/0226423 A1 | 9/2007 | Arimilli et al. |
| 2007/0226426 A1 | 9/2007 | Clark et al. |
| 2008/0109585 A1 | 5/2008 | DeMent et al. |
| 2008/0109609 A1* | 5/2008 | Shen et al. ............... 711/146 |
| 2008/0126750 A1 | 5/2008 | Sistla |
| 2008/0282040 A1 | 11/2008 | Doring |
| 2009/0089512 A1* | 4/2009 | Shen et al. ............... 711/146 |
| 2009/0113138 A1* | 4/2009 | Bass et al. ............... 711/144 |
| 2009/0177845 A1 | 7/2009 | Moyer et al. |
| 2009/0199028 A1 | 8/2009 | Arimilli et al. |
| 2009/0240892 A1 | 9/2009 | Moyer |
| 2009/0300289 A1 | 12/2009 | Kurts et al. |
| 2010/0235335 A1 | 9/2010 | Heman et al. |

OTHER PUBLICATIONS

K. Strauss et al, "Flexible Snooping: Adaptive Forwarding and Filtering of Snoops in Embedded-Ring Multiprocessors" *Proceedings of the 33rd International Symposium on Computer Architecture* (ISCA '06), 2006, 12 pages.

L. Hammond et al, "Transactional Memory Coherence and Consistency" 2004, 12 pages.

H. Cho et al, "Maintaining cache coherency in a multisystem data sharing environment" *Journal of Systems Architecture*, vol. 45, Dec. 1998, pp. 285-303.

Cache Coherence on a Slotted Ring, Luiz A. Barroso and Michel Dubois, EE-Systems Department, University of Southern California, Los Angeles, CA 90089-1115, Published in ICPP '91.

Coherence Ordering for Ring-based Chip Multiprocessors, Michael R. Marty and Mark D. Hill, Computer Sciences Department, University of Wisconsin-Madison, 39th Annual IEEE/ACM Symposium on Microarchitecture (MICRO-39). 2006.

Cache Coherent Architecture for Large Scale Multiprocessors, Phanindra K. Mannava, Akhilesh Kumar & Laxmi N. Bhuyan, Department of Computer Science, Texas A&M University, College Station, TX 77843-3112.

IEEE Standard for Scalable Coherent Interface (SCI), Microprocessor and Micorcomputer Standards Subcommittee of the IEEE Computer Society, Approved Mar. 19, 1992, IEEE-SA Standards Board, IEEE Std 1596-1992.

Design Options for Small Scale Shard Memory Multiprocessors, Luiz Andre Barroso, A Dissertation Presented to the Faculty of the Graduate School, University of Southern California, In Partial Fulfillment of the Requirements for the Degree Doctor of Philosophy (Computer Engineering), Dec. 1996.

* cited by examiner

Cycle N: snp versus rsp slotting

Cycle N+1: snp versus rsp slotting

DATA PROCESSING APPARATUS AND METHOD FOR MANAGING COHERENCY OF CACHED DATA

BACKGROUND OF THE INVENTION

1. Field of the Invention

The present invention relates to a data processing apparatus and method of managing coherency of cached data.

2. Description of the Prior Art

It is known to provide multiple processing elements within a data processing system, for example multiple processor cores, or a mixture of processor cores and other components such as a graphics processing unit, a direct memory access (DMA) controller, an input/output agent, etc. It is also known to provide various of those processing elements with their own dedicated cache structures, so as to increase speed of data access for those processing elements, and hence improve the overall performance of the data processing system. Processing elements with their own dedicated cache structures will be referred to herein as caching nodes.

However, when a data processing system has multiple such caching nodes, this complicates the issue of data coherency. In particular, it will be appreciated that if a particular caching node performs a write operation with regards to a data value held in its local cache, that data value will be updated locally within the cache, but may not necessarily also be updated at the same time in any lower level of the memory hierarchy, such as a shared level of cache or shared memory. As an example, if the data value in question relates to a write back region of memory, then the updated data value in the cache will only be stored back to the lower level of the memory hierarchy when that data value is subsequently evicted from the local cache.

Since the data may be shared with other caching nodes, it is important to ensure that those caching nodes will access the up-to-date data when seeking to access the associated address in shared memory. To ensure that this happens, it is known to employ a cache coherency protocol within the data processing system to ensure that if a particular caching node updates a data value held in its local cache, that up-to-date data will be made available to any other caching node subsequently requesting access to that data.

The use of such cache coherency protocols can also give rise to power consumption benefits by avoiding the need for accesses to lower levels of the memory hierarchy in situations where data required by a caching node can be found within one of the local caches of another caching node, and hence accessed without needing to access those lower levels of the memory hierarchy.

In accordance with a typical cache coherency protocol, certain accesses performed by a caching node (or certain cache maintenance operations) will require a coherency operation to be performed. This is often determined by a centralised coherency manager. When it is determined that a coherency operation is required, the coherency manager will cause a snoop request to be sent to the other caching nodes (or at least an identified subset of the caching nodes) identifying the type of access taking place and the address being accessed. This will cause those other caching nodes to perform certain coherency actions defined by the cache coherency protocol, and typically results in certain information being fed back as snoop response data to the coherency manager. By such a technique, the coherency of the data held in the various local caches is maintained, ensuring that each caching node accesses up-to-date data. One such cache coherency protocol is the "Modified, Owned, Exclusive, Shared, Invalid" (MOESI) cache coherency protocol.

As the number of caching nodes increases within modern data processing systems, it is becoming ever more important to provide efficient mechanisms for performing the required snoop operations. Various types of interconnect structure have been considered for coupling the various caching nodes with the coherency manager so as to allow snoop requests to be efficiently passed to the required caching nodes, and to allow snoop responses to be returned to the coherency manager. Currently, research has been undertaken into the use of ring-based interconnect structures for providing coherency between multiple caching nodes. Examples of documents discussing the use of such ring-based interconnect structures include the article "Cache Coherence on a Slotted Ring" by L A Barroso et al, published in ICPP '91, the article "Coherence Ordering for Ring-based Chip Multiprocessors" by M Marty et al, published in the proceedings of the 39th Annual IEEE/ACM Symposium on Microarchitecture, 2006, and the article "Cache Coherent Architecture for Large Scale Multiprocessors" by P Mannava et al, published in the proceedings of the Fifth Workshop on Scalable Shared Memory Multiprocessors, International Symposium on Computer Architecture, 1995. The use of ring-based interconnect structures is also discussed in the "IEEE Standard for Scalable Coherent Interface (SCI)" published as IEEE Standard 1596-1992.

When using such ring-based interconnect structures, one issue that arises is the amount of traffic passing around the ring, which will include both snoop requests and snoop responses. It is known to use a single broadcast snoop request instead of multiple directed snoop requests in order to reduce the amount of snoop request traffic required. However, reducing the amount of snoop response traffic is more complex. The snoop response traffic is particularly problematic, since for each snoop request there will typically be multiple separate snoop responses from each of the caching nodes subjected to the snoop request. Outside of the area of ring-based interconnect structures, various schemes have been proposed in the literature where trees are embedded into the network topology to aggregate snoop responses on their way back to the snoop originator. However, such tree-based schemes do not lend themselves to use within a ring-based interconnect structure.

Accordingly, it would be desirable to provide a technique for reducing the amount of snoop response traffic within a ring-based interconnect.

SUMMARY OF THE INVENTION

Viewed from a first aspect, the present invention provides a data processing apparatus comprising: an interconnect having a plurality of interconnect nodes arranged to provide at least one ring; a plurality of caching nodes, each caching node being configured to cache data and being coupled into the interconnect via an associated one of said interconnect nodes; at least one coherency management node for implementing a coherency protocol to manage coherency of the data cached by each of said caching nodes, each coherency management node being coupled into the interconnect via an associated one of said interconnect nodes; said at least one ring providing a plurality of slots for transmission of information around said at least one ring, within each said at least one ring the slots provided for that ring being passed sequentially between said plurality of interconnect nodes; the at least one coherency management node being configured, in response to detection of a coherency condition, to issue a snoop request to at least a subset of said plurality of caching nodes, the snoop request having an identifier which identifies at least one slot of said plurality of slots to be used to transmit snoop responses for that snoop request; when each caching node in said at least a subset produces a snoop response for said snoop request, the associated interconnect node being configured to output that snoop response in one of said at least one identified slots; and each interconnect node associated with a caching node having merging circuitry configured, when outputting the snoop response in one of said at least one identified slots, to merge that snoop response with any current snoop response information held in that slot.

In accordance with the present invention, each snoop request issued has an identifier (either explicit or inferred) that identifies at least one slot to be used to transmit snoop responses for that snoop request. As each caching node subjected to the snoop request produces a snoop response for that snoop request, the associated interconnect node merges that snoop response with any current snoop response information held in the identified slot. Hence, this enables the snoop response information to be aggregated within at least one identified slot associated with an issued snoop request as that slot is passed around the ring between the various interconnect nodes.

In one embodiment, the plurality of slots comprise request slots and response slots, and the snoop request is output on said at least one ring in one of said request slots.

Whilst the identifier for the snoop request may be explicitly provided in association with the snoop request, in one embodiment the identifier for the snoop request is inferred from the request slot in which that snoop request is output. This provides a simple and effective mechanism for identifying the appropriate slot in which to store the aggregated snoop response traffic for each snoop request.

Whilst in some embodiments more than one slot may be identified for the transmission of the snoop responses for a particular snoop request, in one embodiment a single response slot is identified by said identifier.

The single response slot can be chosen in a variety of ways. However, in one embodiment, said single response slot is chosen so as to be separated in time from the associated request slot by a time period corresponding to an expected latency of each caching node. Accordingly, by way of example, if each caching node were expected to have its snoop response available four cycles after receiving a snoop request, the response slot may be positioned relative to the associated request slot so that the response slot is passed to each caching node four cycles after that caching node receives the snoop request in the associated request slot.

The at least one ring may take a variety of forms. However, in one embodiment, said at least one ring comprises a request ring for routing of the snoop requests and a response ring for the routing of snoop responses.

In one embodiment, each slot has an associated snoop response count indication, and each interconnect node associated with a caching node includes count indication circuitry configured, when the merging circuitry outputs the snoop response in one of said at least one identified slots, to modify said associated snoop response count indication. This provides a simple and effective mechanism for enabling information to be retained in association with each slot about the number of snoop responses that have been aggregated into that slot.

In one embodiment, the interconnect node associated with each coherency management node comprises termination detection circuitry configured, as each slot is received by that interconnect node, to determine from a current value of the snoop response count indication whether all responses for the corresponding snoop request have been received, and if so to route the snoop response information in that slot to the associated coherency management node. If it is determined that not all responses for the corresponding snoop request have been received, then that slot can merely be allowed to pass round the loop once more, with the termination detection circuitry then re-reviewing the snoop response count indication next time that slot is received by the interconnect node associated with the coherency management node. Use of the termination detection circuitry hence provides a simple and efficient mechanism for determining when all of the required snoop responses have been aggregated into the response slot.

In one embodiment, the interconnect node associated with each coherency management node comprises initial snoop response count indication setting circuitry configured, for each issued snoop request, to set an initial value for the snoop response count indication in each response slot identified by said identifier for the transmission of the snoop responses for that snoop request. As mentioned earlier, in one embodiment the response slot associated with a request slot containing the snoop request will be separated in time with respect to the request slot having regards to the expected latency of the caching nodes, and accordingly at the time the interconnect node issues the snoop request in a selected request slot, the associated response slot will not be available to that interconnect node. In such embodiments, the interconnect node will typically buffer the initial value until subsequently the associated response slot passes through the interconnect node, at which time that initial value is then inserted into that response slot by the initial snoop response count indication setting circuitry.

There are a number of ways in which the initial snoop response count indication can be set. For example, if all snoop requests are always issued to the same number of caching nodes, then the initial snoop response count indication may be fixed, and chosen in such a way that if, when the response slot is being considered by the interconnect node associated with the coherency management node, the snoop response count indication matches an expected terminal count indication, that will indicate that all of the snoop responses have been aggregated into the snoop response slot. However, in embodiments where the number of caching nodes subjected to each snoop request may vary, the initial snoop response count indication setting circuitry may set the initial snoop response count indication having regard to the number of caching nodes targeted by the snoop request. There are number of ways in which this may be done, in one embodiment this being done with reference to a lookup table storing initial snoop response count indications for each possible number of caching nodes subjected to a snoop request.

The count indication circuitry provided within each interconnect node associated with a caching node can take a variety of forms. For example, in one embodiment it may take the form of a simple incrementer that increments the snoop response count indication each time a snoop response is merged into the response slot. However, in some embodiments, the time taken to perform such an incrementing function may be a limiting factor in how quickly the interconnect node can process each response slot. With this in mind, in one embodiment, the count indication circuitry comprises an LFSR (linear feedback shift register) incrementer circuit configured to modify the snoop response count indication as the slot passes from a current interconnect node to an adjacent interconnect node within said at least one ring if the merging circuitry of the current interconnect node has merged a snoop response into said slot. It has been found that the use of such an LFSR circuit can significantly increase the speed of operation of the count indication circuitry.

In one embodiment, the snoop response information maintained in the identified slot comprises a plurality of flags, and the merging circuitry is configured to perform a logical or operation in order to update the flags of the current snoop response information held in the identified slot to incorporate the snoop response produced by the associated caching node. When using a cache coherency protocol such as the MESI protocol, examples of such flags may be a "shared" flag and a "modified" flag.

In one embodiment, the merging circuitry merges the snoop response information such that each flag only contains a single merged value, but in such an embodiment the aggregated snoop response information will not directly identify which caching node was responsible for the value of each particular flag. For example, if the "shared" flag is set in the aggregated snoop response, it will not directly be known which caching node is storing the data. If this additional information is desired, then in one embodiment, this is made available by arranging each flag to comprise a plurality of fields, each field corresponding to a different caching node. In such embodiments, the merging circuitry performs the logical or operation in order to update the relevant field of each flag within the snoop response information held in the identified slot. Hence, considering the earlier example, when all of the snoop responses have been aggregated together in the response slot, the values of the various fields within the "shared" flag will identify the caching node or nodes containing the shared data.

Each cache maintenance node may retain information about which caching nodes have cached data for particular memory addresses, and based on that information may determine which caching nodes need to be subjected to any particular snoop request. In that event, when the snoop request is broadcast in a particular request slot, it may include information identifying which caching nodes need to respond to that snoop request (which may be anything from 1 caching node to all caching nodes). However, in alternative embodiment, the snoop request may be broadcast to all of said caching nodes, or at least broadcast to all of the caching nodes other than a caching node causing the snoop request to be issued.

In one embodiment, the presence of said coherency condition is detected either by receipt by the coherency management node of an access request from one of said caching nodes, or by the occurrence of a cache maintenance operation.

Viewed from a second aspect, the present invention provides an interconnect structure for coupling a plurality of caching nodes used to cache data with at least one coherency management node implementing a coherency protocol to manage coherency of the data cached by each of said caching nodes, the interconnect structure comprising: a plurality of interconnect nodes arranged to provide at least one ring, each interconnect node for coupling to one of said caching nodes or to one of said at least one coherency management nodes; said at least one ring providing a plurality of slots for transmission of information around said at least one ring, within each said at least one ring the slots provided for that ring being passed sequentially between said plurality of interconnect nodes, in response to detection of a coherency condition, said at least one coherency management node issuing a snoop request to at least a subset of said plurality of caching nodes, the snoop request having an identifier which identifies at least one slot of said plurality of slots to be used to transmit snoop responses for that snoop request when each caching node in said at least a subset produces a snoop response for said snoop request, the associated interconnect node being configured to output that snoop response in one of said at least one identified slots; and each interconnect node associated with a caching node having merging circuitry configured, when outputting the snoop response in one of said at least one identified slots, to merge that snoop response with any current snoop response information held in that slot.

Viewed from a third aspect, the present invention provides a method of coupling a plurality of caching nodes used to cache data with at least one coherency management node implementing a coherency protocol to manage coherency of the data cached by each of said caching nodes, the method comprising: providing an interconnect having a plurality of interconnect nodes arranged to provide at least one ring; coupling each caching node into the interconnect via an associated one of said interconnect nodes; coupling each coherency management node into the interconnect via an associated one of said interconnect nodes; providing said at least one ring with a plurality of slots for transmission of information around said at least one ring, within each said at least one ring the slots provided for that ring being passed sequentially between said plurality of interconnect nodes; in response to detection of a coherency condition, issuing from said at least one coherency management node a snoop request to at least a subset of said plurality of caching nodes, the snoop request having an identifier which identifies at least one slot of said plurality of slots to be used to transmit snoop responses for that snoop request; when each caching node in said at least a subset produces a snoop response for said snoop request, employing the associated interconnect node to output that snoop response in one of said at least one identified slots; and when outputting the snoop response in one of said at least one identified slots, merging that snoop response with any current snoop response information held in that slot.

Viewed from the fourth aspect, the present invention provides a data processing apparatus comprising: interconnect means having a plurality of interconnect node means for providing at least one ring; a plurality of caching node means, each caching node means for caching data and being coupled into the interconnect means via an associated one of said interconnect node means; at least one coherency management node means for implementing a coherency protocol to manage coherency of the data cached by each of said caching node means, each coherency management node means being coupled into the interconnect means via an associated one of said interconnect node means; said at least one ring providing a plurality of slots for transmission of information around said at least one ring, within each said at least one ring the slots provided for that ring being passed sequentially between said plurality of interconnect node means; the at least one coherency management node means for issuing, in response to detection of a coherency condition, a snoop request to at least a subset of said plurality of caching node means, the snoop request having an identifier which identifies at least one slot of said plurality of slots to be used to transmit snoop responses for that snoop request; when each caching node means in said at least a subset produces a snoop response for said snoop request, the associated interconnect node means for outputting that snoop response in one of said at least one identified slots; and each interconnect node means associated with a caching node means having merging circuitry for merging, when outputting the snoop response in one of said at least one identified slots, that snoop response with any current snoop response information held in that slot.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
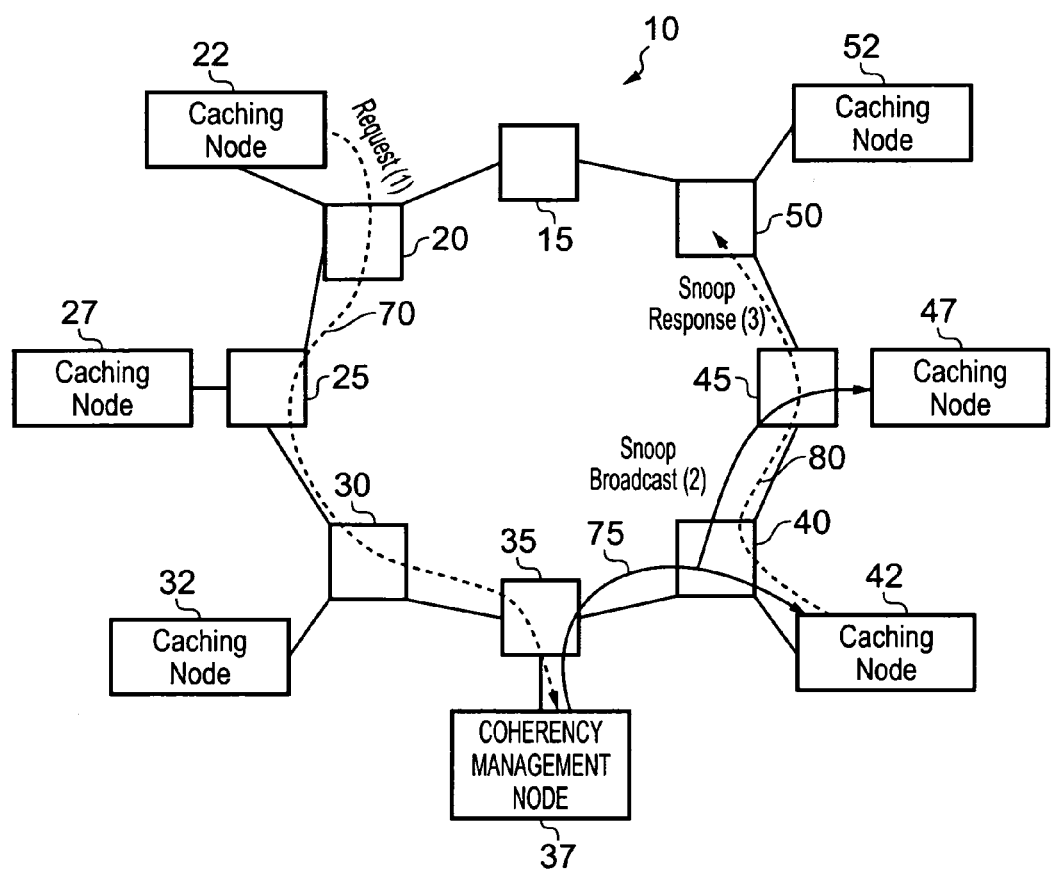
FIG. 1 is a block diagram schematically illustrating a data processing apparatus in accordance with one embodiment.

FIG. 1 schematically illustrates a data processing apparatus in accordance with one embodiment, where a ring-based interconnect structure 10 is used to interconnect a plurality of caching nodes 22, 27, 32, 42, 47 and 52 with at least one coherency management node 37. Each caching node 22, 27, 32, 42, 47 and 52 is coupled into the ring via an associated interconnect node 20, 25, 30, 40, 45 and 50. Similarly, each coherency management node 37 is coupled into the ring via an associated interconnect node 35. Optionally, one or more repeater nodes 15 may be provided within the ring, for example to meet timing requirements. Each coherency management node will typically be associated with a lower level of the memory hierarchy than the caches associated with the caching nodes. As an example, if the caching nodes each incorporate a level 2 cache, the coherency management node 37 may be provided in association with a level 3 cache. Alternatively, or in addition, a coherency management node may be provided in association with a memory controller controlling access to main memory.

A number of logically separate rings may be provided within the ring-based interconnect 10. In one embodiment, such rings will include a uni-directional snoop broadcast ring and a uni-directional snoop response ring.

When a cache miss occurs within one of the caching nodes, an access request will be propagated from that caching node to the coherency management node 37. Hence, by way of example, in FIG. 1 it is assumed that such a cache miss within the caching node 22 has led to a request being issued over path 70 to the coherency management node 37. In one embodiment, a further uni-directional ring is provided for the transmission of such an access request to the coherency management node, but any other suitable mechanism may be provided for the transmission of access requests to the coherency management node.

The coherency management node 37 will then determine which caching nodes should be snooped in order to see whether those caching nodes contain a copy of the data requested by the caching node 22. In one embodiment, the coherency management node 37 merely decides to snoop all caching nodes, but in an alternative embodiment the coherency management node 37 may maintain data (for example a directory structure) identifying which caching nodes have cached which memory addresses, and based thereon may determine a subset of the caching nodes to be subjected to the snoop. It will also be understood that there will be occasions where the coherency management node will determine that the data being requested will definitely not be stored in any of the caching nodes (for example because it relates to a non-cacheable address in memory), and in that event the coherency management node 37 will pass the request on to a lower level of the memory hierarchy rather than initiating a snoop operation.

Assuming a snoop operation is required, then a snoop request is broadcast over the snoop broadcast ring, the broadcast of this snoop request being indicated by the line 75 in FIG. 1. As will be discussed in more detail later, the snoop broadcast ring comprises a number of request slots which are passed sequentially between the plurality of interconnect nodes, in the example of FIG. 1 this occurring in an anticlockwise direction. Accordingly, the coherency management node 37 will place the snoop broadcast request within an available request slot and that slot will then be passed from one interconnect node to the next in a sequence around the ring. Each interconnect node will then determine whether the snoop request needs actioning by its associated caching node, and if so will initiate a cache lookup operation within the relevant caching node.

When each caching node subjected to a snoop has performed this cache lookup operation, it will issue a snoop response for returning to the coherency management node via the snoop response ring. As with the snoop broadcast ring, the snoop response ring comprises a number of slots. Further, the request slot that the snoop request occupied within the snoop broadcast ring will determine which response slot can be used to return that snoop response to the coherency management node. Accordingly, the snoop response may have to be buffered locally within either the caching node or its associated interconnect node until the relevant response slot is passed to that interconnect node, at which point the snoop response can be added to that response slot. As will be discussed in more detail later, merging circuitry within the interconnect node is provided for merging a current snoop response with the snoop response information already present in the response slot, to thereby significantly reduce the amount of response traffic passing around the ring. Considering the example of FIG. 1, the response slots on the snoop response ring are passed in an anticlockwise direction around the ring, and accordingly the passage of the snoop response back to the coherency management node is indicated by the path 80 for the snoop response from caching node 42.

In one embodiment, the slotted ring architecture described above allows packets of information to be moved around the ring synchronously with no delays until a node accepts them.

Figure 2:
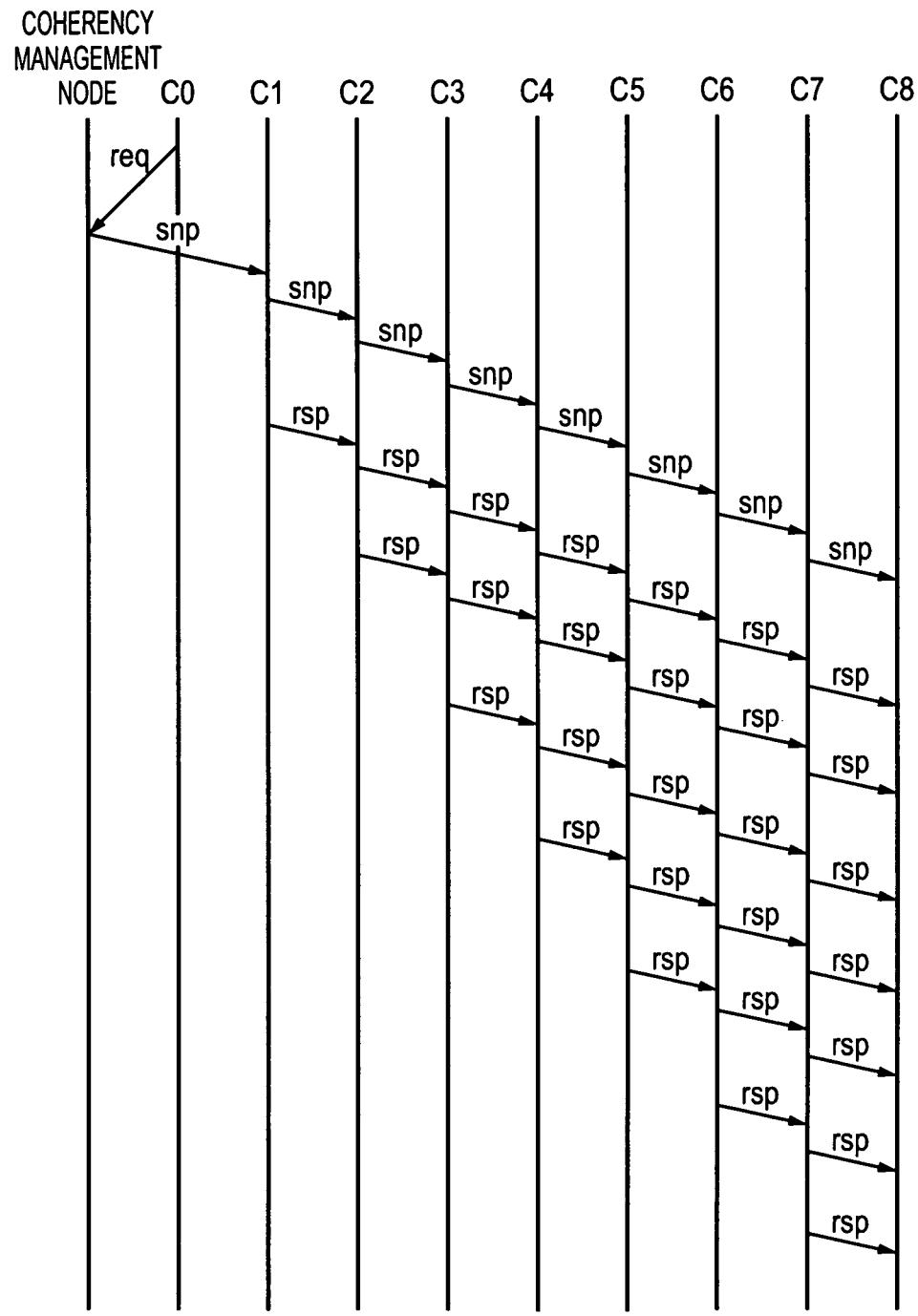
FIG. 2 is a diagram illustrating the proliferation of response traffic that can occur within a ring-based interconnect structure in the absence of the techniques of the described embodiments.

FIG. 2 schematically illustrates the proliferation in response traffic that would occur if the response aggregation mechanism of embodiments of the present invention were not used. In this example, it is assumed that there are eight caching nodes, and hence if one caching node (in this example caching node 0) issues an access request to the coherency management node, this will result in a snoop request being broadcast around the snoop broadcast ring to cause snoop operations to be performed in each of the other seven caching nodes. Each such caching node will issue a response separately on the ring, and accordingly in this example seven separate responses will be passed around the ring. Hence, whilst the broadcast of the snoop request has reduced the snoop request traffic, the lack of aggregation of the snoop responses creates a large volume of response traffic.

Figure 3:
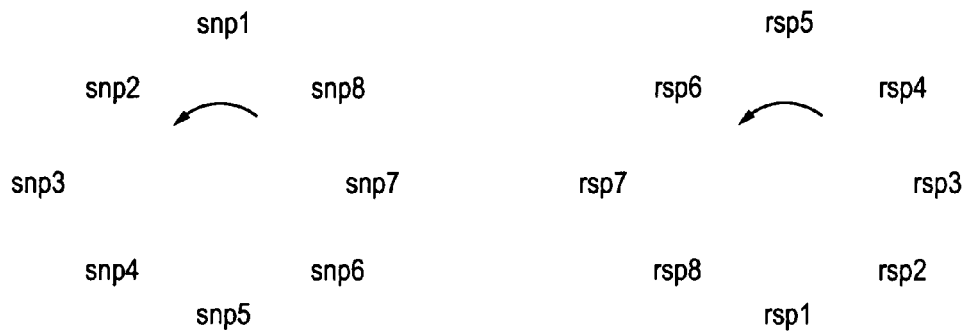
FIG. 3 schematically illustrates the relationship between request slots and response slots in accordance with one embodiment.
Figure 3:
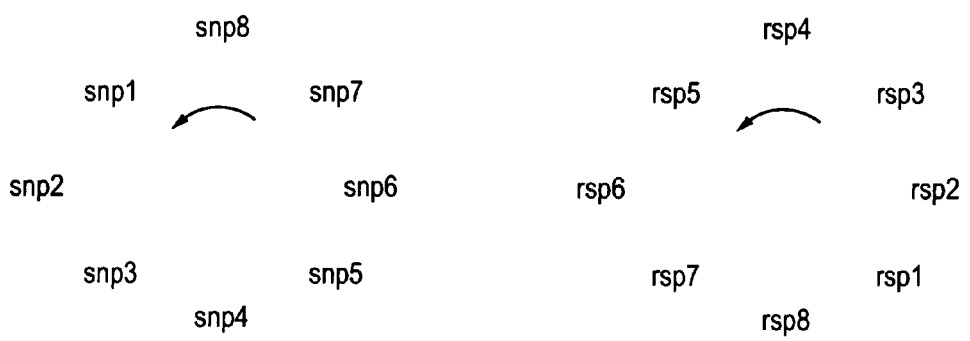

As mentioned earlier, in accordance with embodiments of the present invention, when the coherency management node 37 has a snoop request to broadcast, it will broadcast it in the first available request slot on the snoop broadcast ring. That slot has a logical ID which is then associated with the snoop request, and links that snoop request with a particular response slot in which the snoop responses for that snoop request need to be issued. The coherency management node then waits for the snoop response on the snoop request's paired response slot. In one embodiment, the paired response slot is separated from the request slot by some delayed amount, calculated having regard to the expected latency of the caching node when handling a snoop request. This is illustrated schematically in FIG. 3 where it is assumed that on average a caching node will take four cycles to process a snoop request, and accordingly the paired response slot for each snoop request slot is staggered by four slot positions with respect to the snoop request slot. In this example, it is assumed that there are eight interconnect nodes (as in FIG. 1), and accordingly, there are eight slot positions within the ring. Each clock cycle, the request slots and response slots are passed in an anticlockwise direction from one interconnect node to an adjacent interconnect node, this being illustrated by the cycle N and cycle N+1 slot positions shown in FIG. 3.

As discussed earlier, each caching node is responsible for merging (via its associated interconnect node) its snoop response with any prior snoop response already in the relevant response slot. In the case where a particular caching node does not have its snoop response ready by the time that the relevant response slot is received by its associated interconnect node, the caching node will have to wait one or more further full ring rotations until the snoop response is available and the relevant response slot has been received. By such an approach, the scheme supports both fixed latency responses and variable latency responses.

Considering the example where a MESI cache coherency protocol is used, Table 1 below illustrates the various merged responses that in one embodiment are produced (referred to in Table 1 as the "Next Aggregate Response") dependent on the current response issued by a caching node and the current contents of the relevant response slot (referred to in Table 1 as the "Previous Aggregate Response").

TABLE 1

| Previous Aggregate Response | Current Response | Next Aggregate Response |
|---|---|---|
| InvalidResponse | InvalidResponse | InvalidResponse |
| InvalidResponse | SharedResponse | SharedResponse |
| SharedResponse | InvalidResponse | SharedResponse |
| ModifiedResponse | InvalidResponse | ModifiedResponse |
| ModifiedResponse | ModifiedResponse | ERROR |
| InvalidResponse | ModifiedResponse | ModifiedResponse |
| ModifiedResponse | SharedResponse | ERROR |
| SharedResponse | ModifiedResponse | ERROR |
| SharedResponse | Shared Response | SharedResponse |

Figure 4:
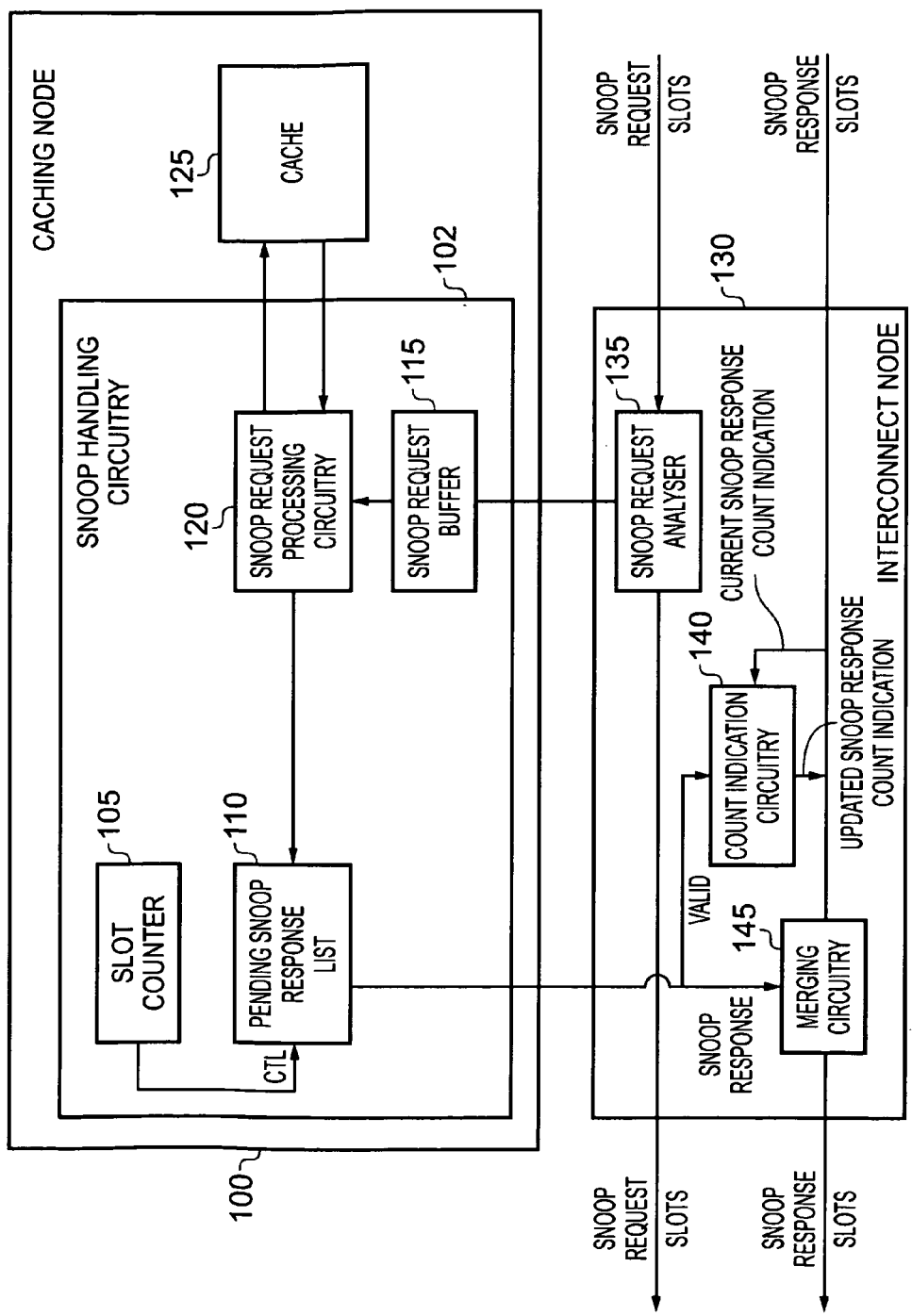
FIG. 4 is a block diagram illustrating components provided within a caching node and its associated interconnect node in accordance with one embodiment.

FIG. 4 is a block diagram of a caching node 100 and associated interconnect node 130 in accordance with one embodiment. As each snoop request slot is received by the interconnect node 130, the snoop request analyzer 135 determines whether a valid snoop request is present in that slot, and if so whether the associated caching node needs to perform a lookup operation in order to generate a snoop response. In one embodiment, various flags will be set within the snoop request in the slot to identify the caching nodes that need to respond to the snoop request.

Whenever a lookup operation is required, the snoop request is passed to the snoop request buffer 115 within the snoop handling circuitry 102 of the caching node 100. Each snoop request is then read from the buffer by the snoop request processing circuitry 120, which performs the required lookup in the cache 125 in order to determine whether the requested data is present in the cache, and if so the status of the data (such as whether it is marked as modified, shared, etc). Based on this information, a snoop response is generated which is passed to the pending snoop response list 110.

As mentioned earlier, the snoop response cannot be issued out on to the response ring until the relevant snoop response slot is received. For this purpose, the slot ID associated with each snoop request is passed to the snoop request buffer 115 and from there to the snoop request processing circuitry 120, and is then included as a control field with the snoop response stored in the pending snoop response list 110. A slot counter 105 then keeps track of which response slot is currently received by the interconnect node 130. In one embodiment, this is entirely deterministic, since each response slot is moved from one interconnect node to the next interconnect node every clock cycle. When the relevant response slot is received by the interconnect node, the snoop response is output from the snoop response list 110 to both the merging circuitry 145 and the counter indication circuitry 140 provided within the interconnect node 130. In the presence of a valid snoop response issued from the pending snoop response list, the counter indication circuitry 140 receives the current snoop response counter indication maintained within the snoop response slot and updates that count indication in order to output in that response slot an updated snoop response count indication. As will be discussed in more detail later, the snoop response count indication is used to identify how many snoop responses have been aggregated into the snoop response slot, and thus enables the coherency management node 37 to determine in due course whether all snoop responses have been received.

The merging circuitry 145 merges the snoop response with the current contents of the snoop response slot, for example by implementing the merging function discussed earlier with reference to Table 1.

Figure 5:
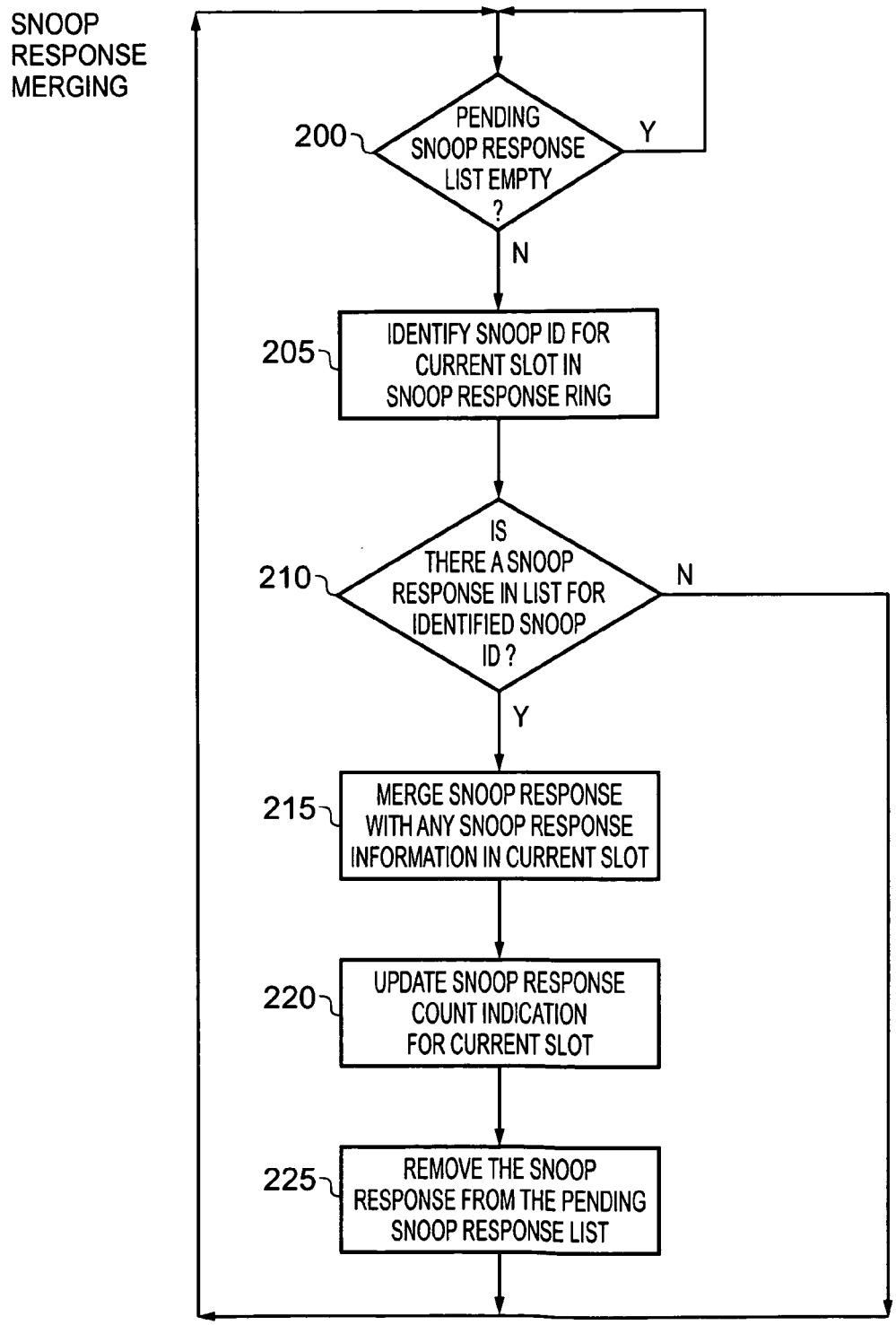
FIG. 5 is a flow diagram illustrating a snoop response merging operation performed by the circuitry of FIG. 4 in accordance with one embodiment.

The snoop response merging process is illustrated in more detail in the flow diagram of FIG. 5. At step 200, it is determined whether the pending snoop response list 110 is empty, and if so no action is taken. However, if the pending snoop response list is not empty, the snoop ID for the current response slot in the snoop response ring (i.e. that response slot presently received by the interconnect node 130) is determined at step 205, and then at step 210 it is determined whether there is a snoop response in the snoop response list for that identified snoop ID. If not, no further action is taken, and the process returns to step 200. However, if there is such a snoop response in the list, then the process proceeds to step 215, where the snoop response is merged with any snoop response information in that current response slot. In addition, at step 220, the count indication circuitry 140 updates the snoop response count indication for the current slot. Thereafter, at step 225, the snoop response is removed from the pending snoop response list 110, and the process then returns to step 200.

Figure 6:
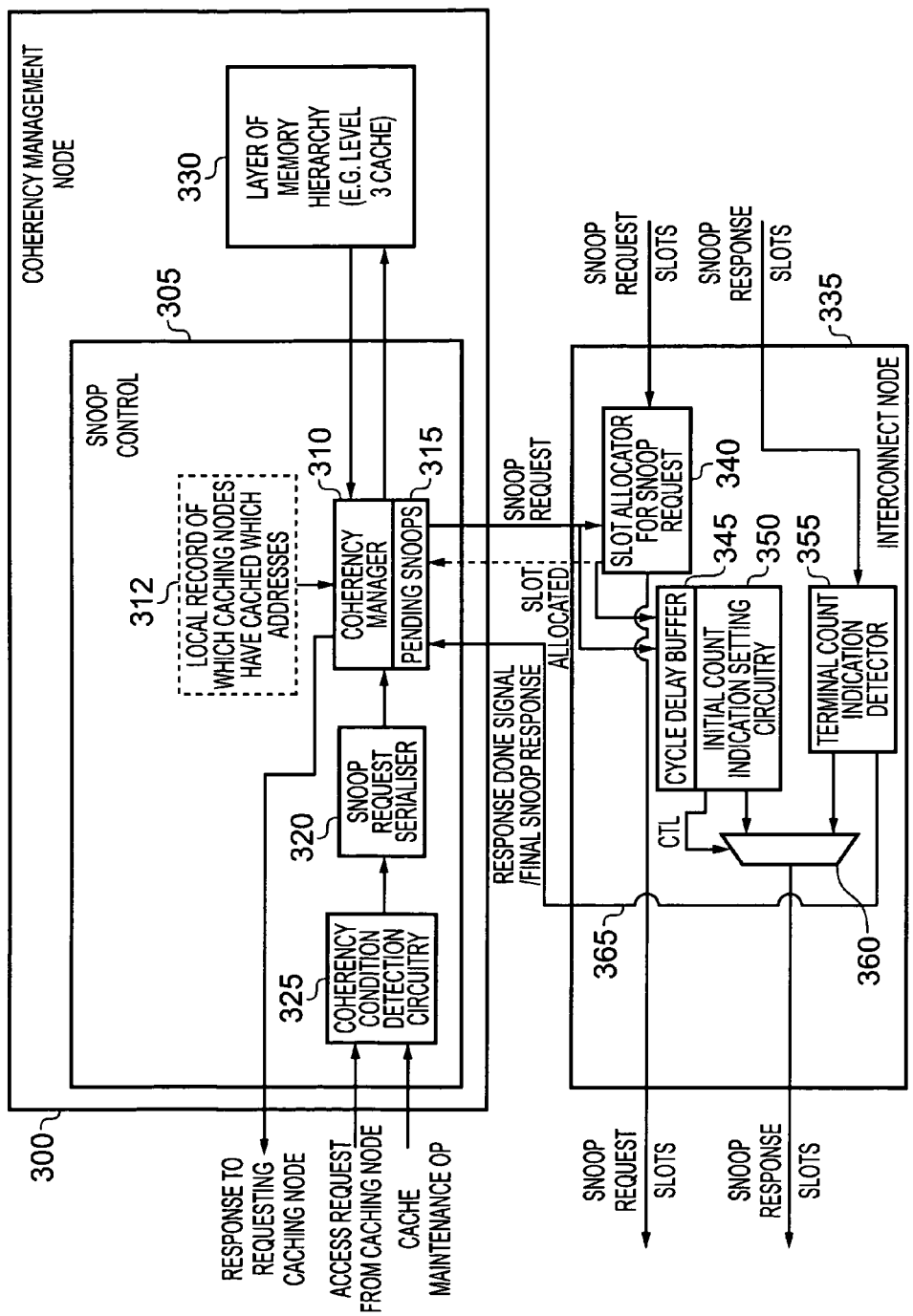
FIG. 6 is a block diagram illustrating components provided within a coherency management node and associated interconnect node in accordance with one embodiment.

FIG. 6 is a block diagram illustrating components provided within the coherency management node 300 and associated interconnect node 335 in accordance with one embodiment. Various conditions will cause the snoop control block 305 to generate snoop requests. One such condition is the receipt of an access request from one of the caching nodes, as discussed earlier. However, in addition, certain cache maintenance operations may also cause a snoop request to be issued. These conditions are detected by the coherency condition detection circuitry 325, and whenever such a condition is detected, a snoop request is forwarded to the snoop request serialiser 320. This turns the received requests into a series of snoop requests passed one at a time to the coherency manager 310. The coherency manager 310 will determine, from the information provided with the snoop request, whether a snoop operation should be performed, and if so which caching nodes should be subjected to that snoop request.

As mentioned earlier, in one embodiment, all of the caching nodes other than the caching node issuing an access request will be subjected to a snoop operation, and for cache maintenance operations all of the caching nodes will be subjected to the snoop operation. However, in an alternative embodiment, some local record of which caching nodes have cached which addresses can be kept, this being illustrated schematically by the dotted box 312 in FIG. 6. This information can be used by the coherency manager 310 to produce a more directed snoop request so as to only cause snoop operations to be performed by a subset of the caching nodes, thereby reducing energy consumption and typically improving performance. If it is determined that a snoop request is not appropriate (for example because a non-cacheable memory address is being accessed, then a lookup operation can be initiated within the appropriate lower layer of the memory hierarchy 330 (for example a level 3 cache in an embodiment where each caching node includes a level 2 cache).

As each snoop request is generated, it is placed in a pending snoop buffer 315 and that snoop request is passed to the slot allocator circuitry 340. The slot allocator circuitry 340 will place that snoop request in the first free request slot, and in one embodiment will return a signal to the pending snoop buffer 315 identifying which slot has been allocated for that snoop request. This will in due course enable the final snoop response sent to the pending snoop buffer to be matched with the original snoop request. However, in an alternative embodiment, rather than the allocated slot information being returned to the pending snoop buffer, a transaction ID maintained in the pending snoop buffer 315 can be included in the information passed to the slot allocator circuitry 340, and that transaction ID can be passed in the snoop request. In such an embodiment, that transaction ID information is then routed to the snoop handling circuitry 102 within the caching node and is maintained so that when the snoop response is finally issued into the response slot, that transaction ID is still present. In due course, that transaction ID can then be returned with the final snoop response over path 365, enabling the snoop response to be matched with the original transaction.

As each snoop request is issued in a request slot, it is necessary to determine an appropriate initial count indication to subsequently set within the associated response slot when that response slot is received by the interconnect node 335. To achieve this, a cycle delay buffer 345 is provided for receiving details of each snoop request and the slot allocated to that snoop request. As each response slot is received by the interconnect node 335, the initial count indication setting circuitry 350 determines whether there is any entry in the cycle delay buffer 345 for the associated slot ID, and if so a control signal is issued to the multiplexer 360 to cause an initial count indication value to be introduced into the response slot that is then output from the interconnect node 335.

As shown in FIG. 6, the interconnect node also includes a terminal count indication detector circuitry 355, which compares the count indication contained in each response slot received by the interconnect node 335 with an expected terminal count indication. In the event of a match, this indicates that the response slot includes all of the aggregated responses, and accordingly a response done signal along with the final snoop response is issued over path 365 to the pending snoop buffer 315. However, in the event that the current count indication does not match the expected terminal count indication, the response slot is allowed to merely pass around the ring one more time in order to allow the relevant caching nodes that have not yet responded to merge their snoop response into the response slot. This can continue for as long as necessary until all snoop responses have been produced and aggregated into the relevant response slot.

Figure 7:
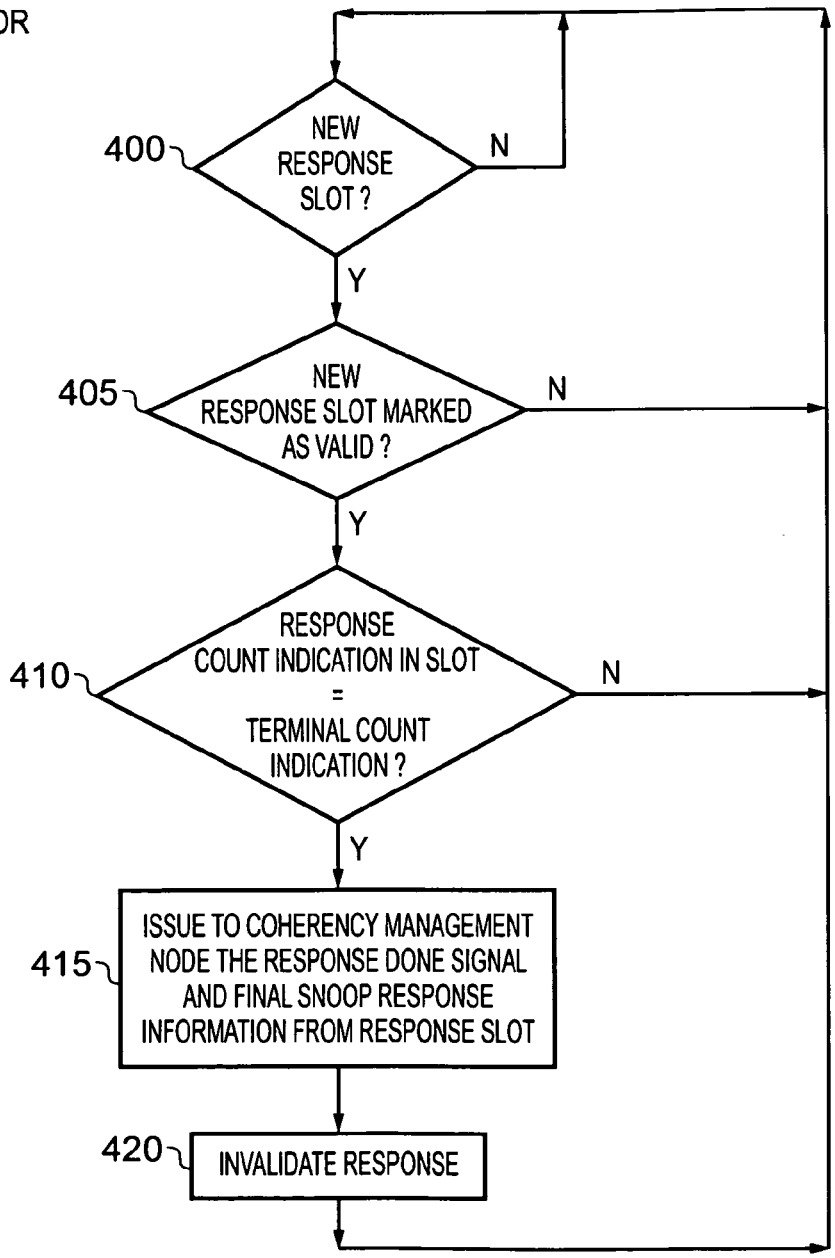
FIG. 7 is a flow diagram illustrating the operation of the terminal count indication detector of FIG. 6 in accordance with one embodiment.

FIG. 7 is a flow diagram illustrating the operation of the terminal count indication detector of FIG. 6 in accordance with one embodiment. Whenever it is determined at step 400 that a new response slot has been received by the interconnect node 335, the process proceeds to step 405 where it is determined whether that new response slot is marked as valid. If not, no action is required and the process returns to step 400. However, assuming the new response slot is marked as valid, the process proceeds to step 410 where it is determined whether the response count indication in the slot is equal to an expected terminal count indication. If not, no action is required and the process returns to step 400.

However, if the response count indication in the slot does match the terminal count indication expected, the process proceeds to step 415, where the response done signal and the final snoop response information from the response slot are issued to the coherency management node 300. In addition, at step 420, the terminal count indicator detector invalidates the response slot, thereby avoiding the possibility that the terminal count indication detector 355 will reissue the response done signal and the final snoop response the next time that response slot is received by the interconnect node 335.

Figure 8:
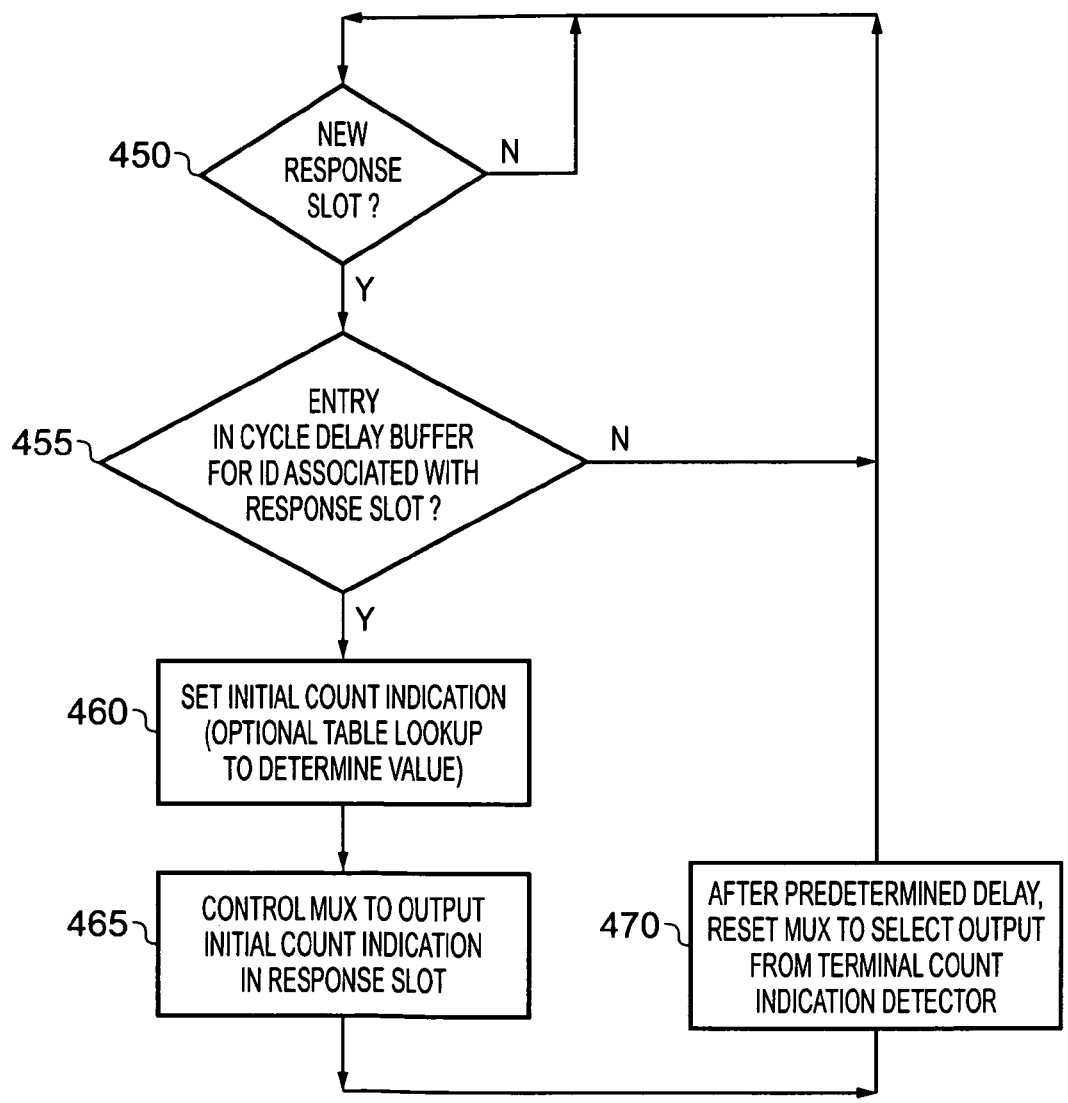
FIG. 8 is a flow diagram illustrating the operation of the initial count indication setting circuitry of FIG. 6 in accordance with one embodiment.

FIG. 8 is a flow diagram illustrating the operation of the initial count indication setting circuitry 350 of FIG. 6 in accordance with one embodiment. Whenever it is determined at step 450 that a new response slot has been received by the interconnect node 335, then process proceeds to step 455, where it is determined whether there is an entry in the cycle delay buffer 345 for the ID associated with the response slot. If not, no action is required, and the process returns to step 450. However, assuming that there is such an entry, then at step 460 the initial count indication is set. In embodiments where the same number of caching nodes are always subjected to the snoop request, this value may be predetermined. However, in alternative embodiments where the number of caching nodes subjected to the snoop request may vary, an optional table lookup process can be used in order to determine the appropriate initial count indication to set in the response slot, such that once all of the necessary snoop responses have been aggregated into the response slot, the count indication value will then equal the expected termination value.

Following step 460, the multiplexer 360 is controlled at step 465 in order to output the determined initial count indication into the response slot. Thereafter, at step 470, the multiplexer is reset after a predetermined delay (typically one cycle) so that the output from the terminal count indication detector 355 is then the default output on to the snoop response ring. The process then returns to step 450.

Figure 9:
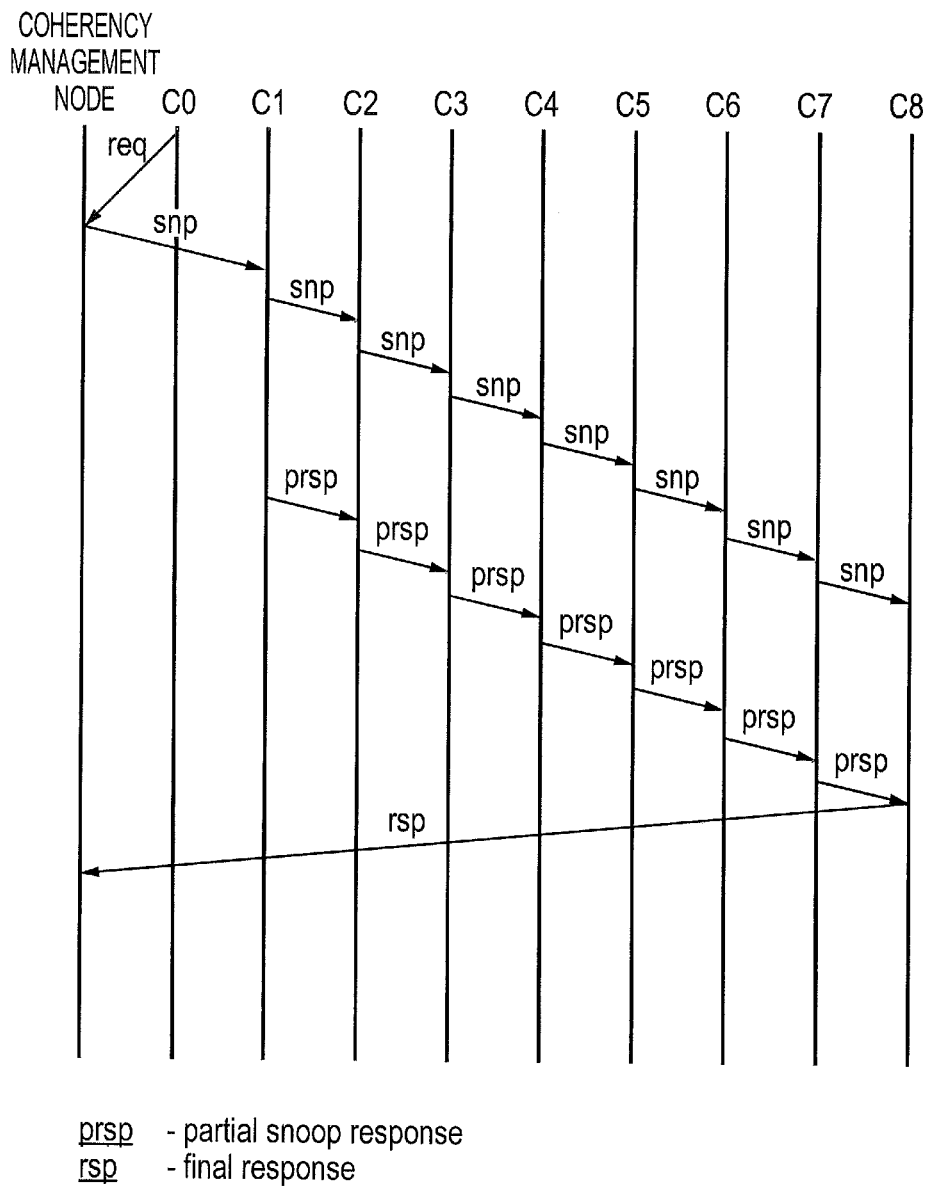
FIG. 9 schematically illustrates the snoop response aggregation that occurs when implementing the techniques of the described embodiments.

FIG. 9 schematically illustrates how the above described techniques cause a significantly reduction in the snoop response traffic. Each caching node updates the partial snoop response with its own snoop response as and when available, and once all snoop responses have been merged into the snoop response slot, the interconnect node associated with the coherency management node will then interpret that aggregated information as being the final snoop response by detecting that the count indication value now equals the terminal count indication value expected.

Figure 10:
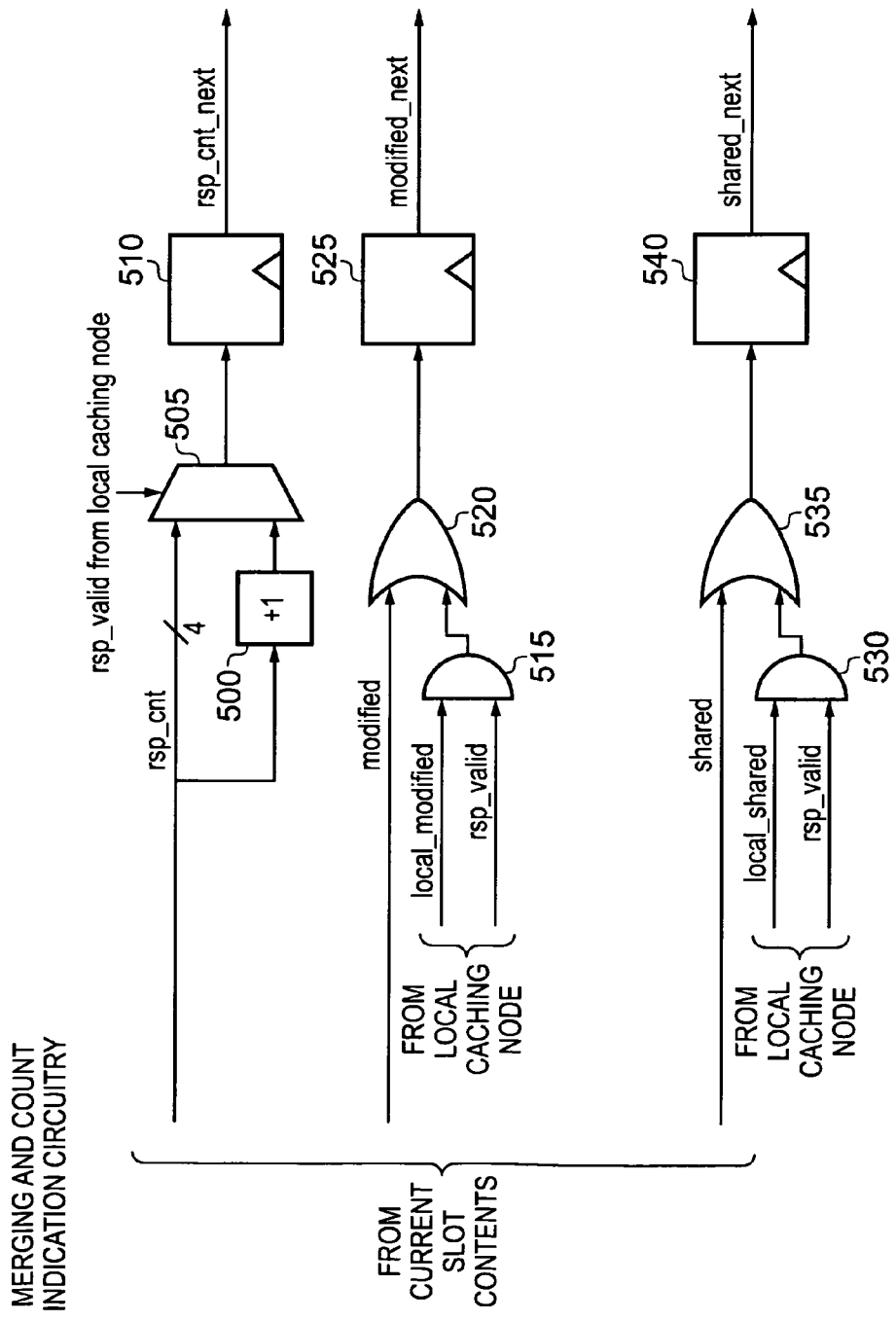
FIG. 10 is a block diagram illustrating in more detail components provided within the merging circuitry and count indication circuitry of FIG. 4 in accordance with one embodiment.

FIG. 10 is a diagram illustrating in more detail components provided within the count indication circuitry 140 and merging circuitry 145 of FIG. 4 in accordance with one embodiment. In this example, it is assumed that three signals are provided within each snoop response slot, namely a response count indication signal, a "modified" signal to indicate if one or more of the caching nodes contain a copy of the requested data and that data is marked as modified, and a "shared" field identifying if one or more of the caching nodes contain a copy of the requested data, and that data is marked as shared. The incrementer 500 and the multiplexer 505 implement the functionality of the count indication circuitry 140, such that whenever a response valid signal is issued from the local caching node 100, the output of the incrementer 500 is selected by the multiplexer and stored within the latch 510 for output in the next cycle to the next interconnect node in the ring.

The remaining circuitry implements the functionality of the merging circuitry 145, which receives local modified and local shared signals from the pending snoop response list 110, along with a response valid signal. Whenever the response valid signal is set, the AND gates 515, 530 cause those local modified and local shared values to be output to the OR gates 520, 535, respectively. The OR gates cause the local signals for the current snoop response to be merged within the existing signals, with those outputs then being stored in the latches 525, 540, respectively, for onward propagation to the next interconnect node in the next cycle.

Figure 11:
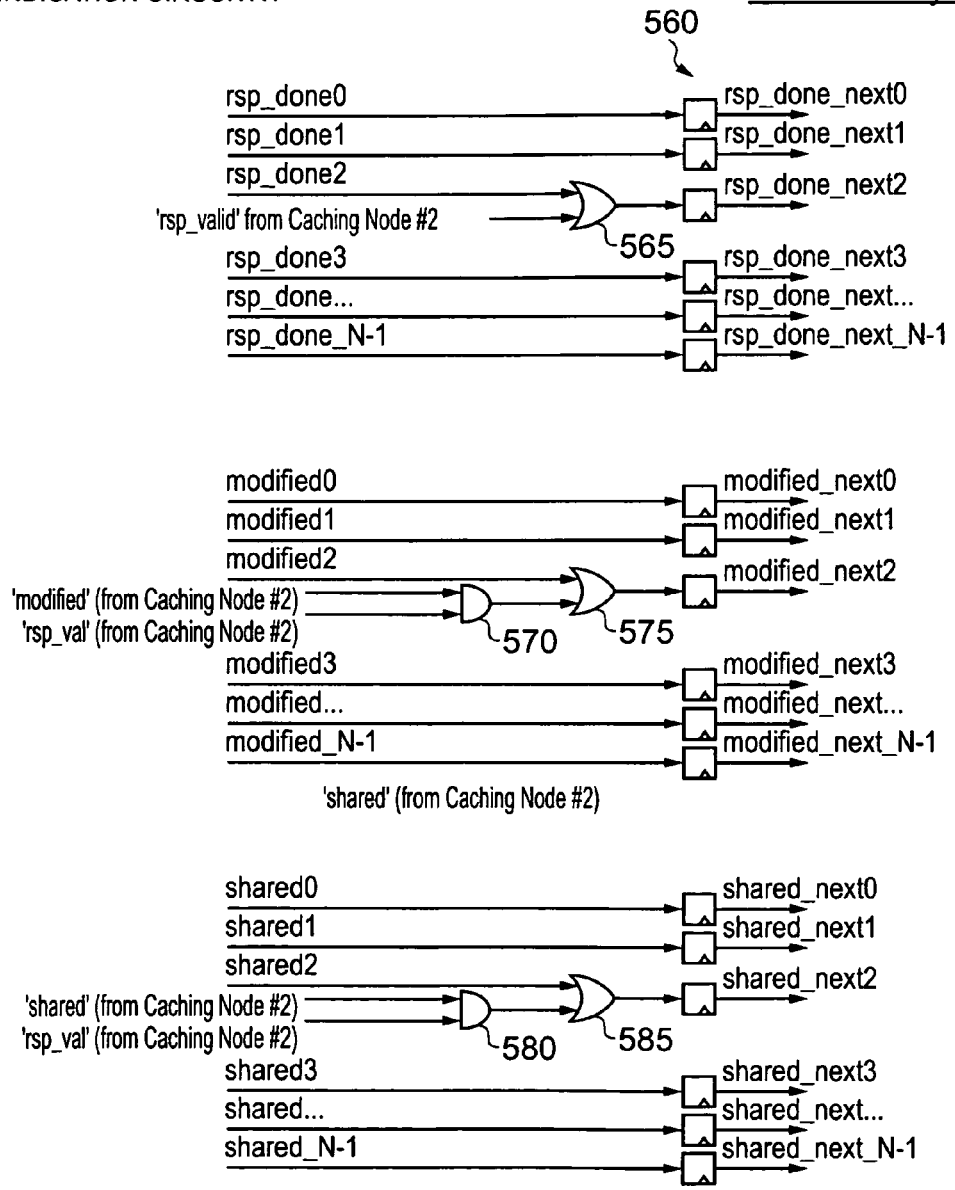
FIG. 11 is a block diagram illustrating in more detail components provided within the merging circuitry and count indication circuitry of FIG. 4 in accordance with an alternative embodiment.

FIG. 11 illustrates an alternative embodiment where, instead of simply merging all of the snoop responses in order to produce single modified and shared signals, separate signals are maintained for each caching node. In this embodiment, there is no need for any incremented counter, and instead separate response done fields are provided for each caching node, which are set when the relevant snoop response has been merged into the response slot. In FIG. 11, this is illustrated for the example of caching node 2. Hence, in this example, the count indication circuitry for caching node 2 comprises a simple OR gate 565, which sets the rsp_done_n-ext2 field (i.e. indicating that a response from caching node 2 has been merged into the response slot) whenever a response valid signal is received from caching node 2. Considering now the merging circuitry 145, the AND gates 570, 580 and OR gates 575, 585 operate in the same way as the AND gates 515, 530 and OR gates 520, 535 of FIG. 10, but now operate solely on the modified2 and shared2 signals indicating the value of the snoop response for caching node 2. All of the various signals passing in the response slot are stored in associated latches 560.

Whilst the embodiment of FIG. 11 requires the provision of more physical wires, the circuitry is relatively simple, and no count incrementer is required as was the case with the embodiment of FIG. 10. In addition, information is retained within the response slot as to which caching node or caching nodes have cached copies of the data requested, and how that data is marked in each of those caching nodes.

Figure 12:
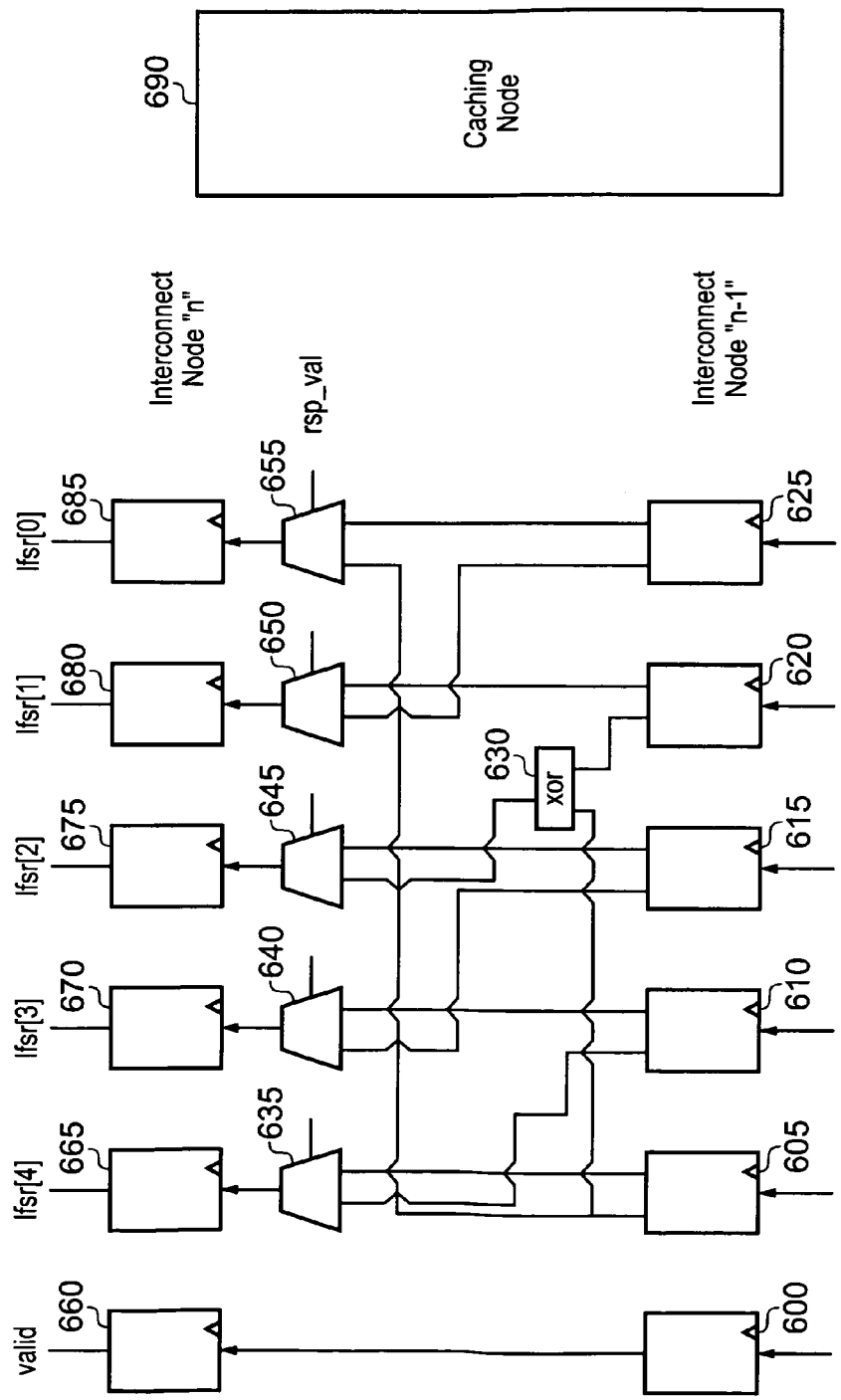
FIG. 12 illustrates an LFSR mechanism that can be used to replace the incrementer of FIG. 10 in accordance with one embodiment.

When using the approach of FIG. 10, one component which can limit the operating speed of the merging and count indication circuitry is the incrementer 500. FIG. 12 illustrates an alternative embodiment, where instead of the incrementer 500, an LFSR mechanism is used to update the count indication as it is moved from one interconnect node to the next in the presence of a response valid signal. Hence, if in node n–1, the current count indication is stored in the latches 605, 610, 615, 620, 625, then in the absence of a response valid signal from the interconnect node n–1, that count indication is not updated as it is transferred to the corresponding latches 665, 670, 675, 680 and 685 within the interconnect node n. This is ensured by selecting the right hand inputs of each of the multiplexers 635, 640, 645, 650 and 655. However, in the event of a response valid signal being set in interconnect mode n–1, then as the count indication is passed from interconnect node n–1 to interconnect node n, an LFSR operation is performed by virtue of the various connections shown in FIG. 12 in combination with the XOR function 630, and the left hand input of each of the multiplexers 635, 640, 645, 650, 655 is selected for onward propagation to the latches of interconnect node n. In each case, the response slot valid signal passes unchanged from the latch 600 to the latch 660. This was also the case in the examples of FIGS. 10 and 11, but for simplicity that signal was omitted from those figures.

Figure 13:
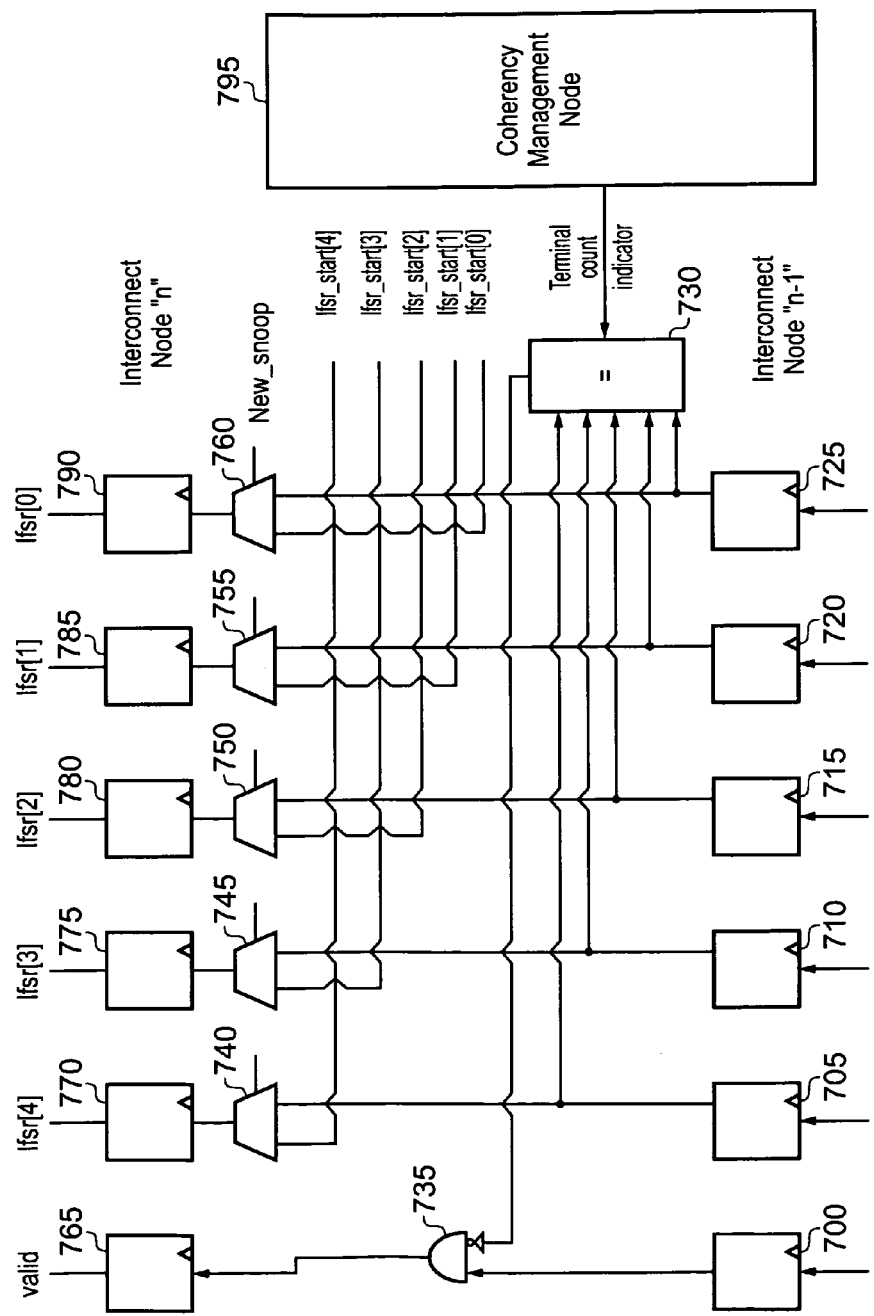
FIG. 13 illustrates components provided within the initial counter indication setting circuitry and terminal count indication detector of FIG. 6 when using the LFSR mechanism of FIG. 12 within the count indication circuitry of FIG. 4.

FIG. 13 illustrates the circuitry that may be provided to form the initial count indication setting circuitry 350 and the terminal count indication detector 355 of FIG. 6 when such an LFSR mechanism is used. In the absence of a new snoop request having been inserted into the equivalent snoop request slot by interconnect node n–1 (in this case the interconnect node associated with the coherency management node), the right hand inputs of each of the multiplexers 740, 745, 750, 755, 760 are selected so that the count indication value output from the latches 705, 710, 715, 720, 725 is unchanged as the corresponding response slot passes to the latches 770, 775, 780, 785 and 790 within the interconnect node n. However, whenever the interconnect node n–1 has inserted a new snoop request into the snoop request slot associated with the current snoop response slot, then an initial count indication value (as indicated by the contents of the cycle delay buffer 345) will be inserted via the multiplexers 740, 745, 750, 755, 760 as the response slot signals are propagated on to interconnect node n, thereby implementing the required functionality of the initial count indication setting circuitry 350. As mentioned earlier, a table lookup operation can be performed in order to determine the appropriate initial count indication value to set.

Considering now the terminal count indication detector 355, this can be implemented by the comparison logic 730 which takes a terminal count indicator value from the coherency management node 795 associated with interconnect node n–1, and compares that with the current count indication value. In the event of a match, a logic one value is output to the AND gate 735, which by virtue of the inverter at its input then causes a logic zero value to be output to the latch 765 irrespective of the other input. By this mechanism, it can be seen that the response slot valid signal remains valid as it transitions from the latch 700 of interconnect node n−1 to the latch 765 of interconnect node n, unless the current count indicator matches the terminal count indicator, in which case the response slot valid signal is deasserted. As discussed earlier, in that condition, a response done signal and the final snoop response will be routed over path 365 to the pending snoop buffer 315 within the coherency management node associated with interconnect node n−1.

Whilst an LFSR mechanism is one suitable mechanism that could be used to replace the incrementer 500 of FIG. 10, it will be appreciated that in alternative embodiments different types of counter mechanism could be used, for example a gray code counter.

Whilst in the earlier described embodiments, a single coherency management node was provided, in alternative embodiments, multiple coherency management nodes may be provided if required. For example, in one embodiment a first coherency management node may be provided for access requests issued to particular addresses while a different coherency management node is used for access requests issued to other addresses. This for example may be useful when two mutually exclusive caches are provided, and accordingly a separate coherency management node is provided in association with each of these mutually exclusive caches. As another example, a certain subset of the caching nodes connected to the ring may be associated with one coherency management node, whilst one or more other subsets are associated with one or more other coherency management nodes.

In one simple embodiment, each coherency management node may have a predetermined subset of the snoop request slots and associated snoop response slots allocated to it. However, in certain situations this could result in inefficient use of the available resources, for example where one coherency management node is dealing with a large number of snoop requests and another coherency management node has very few snoop requests to deal with.

Figure 14:
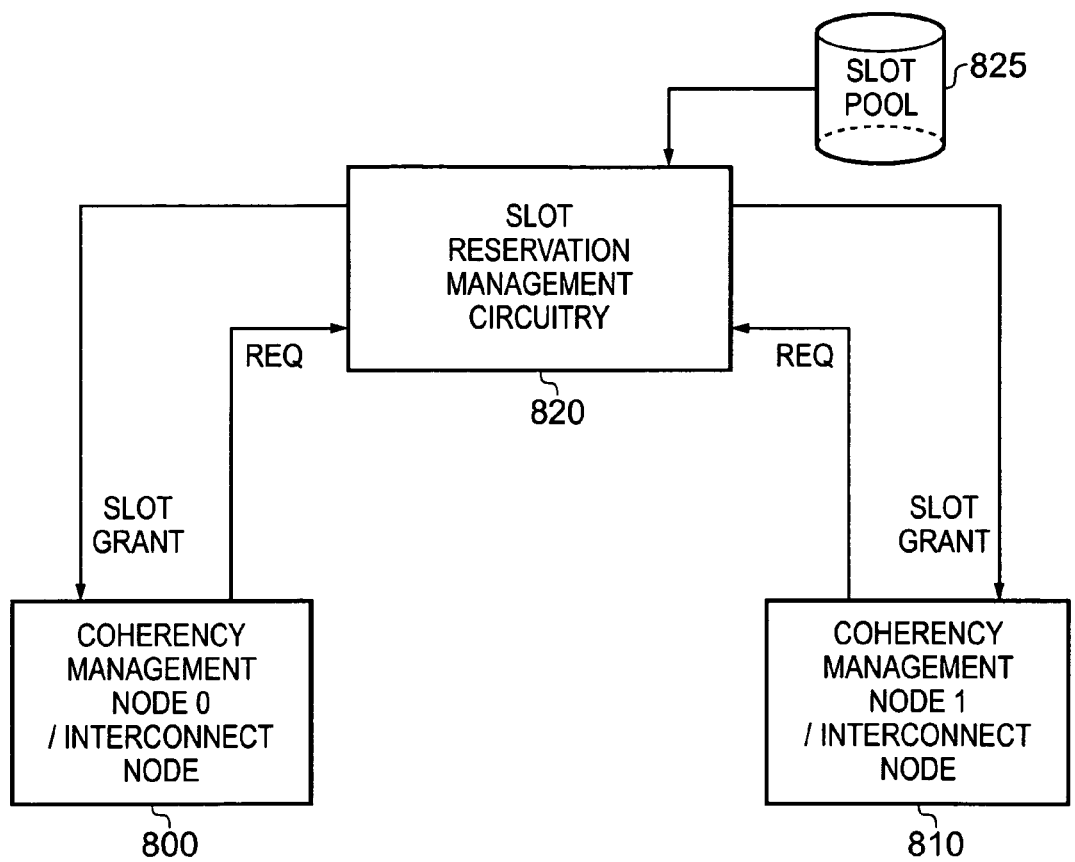
FIG. 14 schematically illustrates how multiple coherency management nodes and associated interconnect nodes may be used in accordance with one embodiment.

FIG. 14 schematically illustrates an alternative embodiment where the snoop request slots allocated to each coherency management node can be altered dynamically. In this example, two coherency management nodes and associated interconnect nodes 800, 810 are provided, both of which are coupled to a slot reservation management circuit 820 maintaining a pool of available slots 825. A certain predetermined number of slots may by default be allocated to each of the coherency management nodes 800, 810, and at a minimum it is expected that there will always be one request slot allocated to each coherency management node. However, if any particular coherency management node wishes to have an increase in the number of slots, it can send a request to the slot reservation management circuitry 820, which can then grant that coherency management node one or more additional slots from the slot pool 825. It will be appreciated that there are a number of known workload balancing mechanisms which could suitably be applied by the slot reservation management circuitry 820 in order to manage the dynamic allocation of slots to the various coherency management nodes in accordance with the basic architecture illustrated in FIG. 14.

From the above described embodiments, it will be appreciated that such embodiments enable a significant reduction in snoop response traffic. Indeed, it has been found that such an approach can reduce snoop response ring transfers by between 45 and 90%. It can also lead to a significant reduction in the wiring required for snoop responses. In addition, the scheme increases fairness and guarantees quality of service on snoop responses. In particular, the first caching nodes to generate a snoop response do not get priority due to ring availability. The maximum amount of cycles to wait for an available response slot is exactly one ring rotation.

Furthermore, the approach of the above described techniques can lower power consumption through minimising ring transfers and reducing the number of wires toggling on the ring.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   an interconnect having a plurality interconnect nodes a arranged to provide at least one ring;
   a plurality of caching nodes, each caching node being configured to cache data and being coupled into the interconnect via an associated one of said interconnect nodes;
   at least coherency management node for implementing a coherency protocol to manage coherency of the data cached by each of said caching nodes, each coherency management node being coupled into the interconnect via an associated one of said interconnect nodes;
   said at least one ring providing a plurality of slots for transmission of information around said at least one ring, within each said at least one ring the slots provided for that ring being passed sequentially between said plurality of interconnect nodes:
   the at least one coherency management node being configured in response to detection of a coherency condition, to issue a snoop request to at least a subset of said plurality of caching nodes the snoop request having an identifier which identifies at least one slot of said plurality of slots to be used to transmit snoop responses for that snoop request;
   when each caching node in said at least a subset produces a snoop response for said snoop request, the associated interconnect node being configured to output that snoop response in one of said at least one identified slots; and
   each interconnect node associated with a caching node having merging circuitry configured, when outputting the snoop response in one of said at least one identified slots, to merge that snoop response with any current snoop response information held in that slot, wherein said plurality of slots comprise request slots and response slots, and said snoop request is output on said at least one ring in one of said request slots, and wherein said identifier for the snoop request is inferred from the request slot in which that snoop request is output.

2. A data processing apparatus comprising:
   an interconnect having a plurality of interconnect nodes arranged to provide at least one ring;
   a plurality of caching nodes, each caching node being configured to cache data and being coupled into the interconnect via an associated one of said interconnect nodes:
   at least one coherency management node for implementing a coherency protocol to manage coherency of the data cached by each of said caching nodes each coherency management node being coupled into the interconnect via an associated one of said interconnect nodes;

said at least one ring providing a plurality of slots for transmission of information said at least one ring, within each said at least one ring the slots provided for the ring being passed sequentially between said plurality of interconnect nodes;

the at least one coherency management node being configured, in response to detection of a coherency condition, to issue a snoop request to at least a subset of said plurality of catching nodes, the snoop request having an identifier which identifies at least one slot of said plurality of slots to be used to transmit snoop responses for that snoop request;

when each caching node in said at least a subset produces a snoop response for said snoop request the associated interconnect node being configured to output that snoop response in one of said at least one identified slots; and each interconnect node associated with a catching node having merging circuitry configured, when outputting the snoop response in one of said at least one identified slots, to merge that snoop response with any current snoop response information held in that slot, wherein said plurality of slots comprise request slots and response slots, and said snoop request is output on said at least one ring in one of said request slots, wherein said at least one slot identified by said identifier for the transmission of the snoop responses for said snoop request comprises a single response slot.

3. A data processing apparatus as claimed in claim 2, wherein said single response slot is chosen so as to be separated in time from the associated request slot by a time period corresponding to an expected latency of each caching node.

4. A data processing apparatus comprising:
an interconnect having a plurality of interconnect nodes arranged to provide at least one ring:
a plurality of caching nodes, each caching node being configured to cache data and being coupled into the interconnect via an associated one of said interconnect nodes
at least one coherency management node for implementing a coherency protocol to manage coherency of the data cached by each of said catching nodes, each coherency management node being coupled into the interconnect via an associated one of said interconnect nodes:
said at least one ring providing a plurality of slots for transmission of information around said at least one ring, within each said at least one ring the slots provided for that ring being passed sequentially between said plurality of interconnect nodes:
the at least one coherency management node being configured, in response to detection of a coherency condition to issue a snoop request to at least a subset of said plurality of caching nodes, the snoop request having an identifier which identifies at least one slot of said plurality of slots to be used to transmit snoop responses for that snoop request;
when each caching node in said at least a subset produces a snoop response for said snoop request, the associated interconnect node being configured to output that snoop response in one of said at least one identified slots; and
each interconnect node associated with a caching node having merging circuitry configured, when outputting the snoop response in one of said identified slots, to merge that snoop response with any current snoop response information held in that slot, wherein:

each slot has an associated snoop response count indication; and
each interconnect node associated with a caching node includes count indication circuitry configured, when the merging circuitry outputs said snoop response in one of said at least one identified slots, to modify said associated snoop response count indication.

5. A data processing apparatus as claimed in claim 4, wherein said at least one ring comprises a request ring for routing of the snoop requests and a response ring for the routing of snoop responses.

6. A data processing apparatus as claimed in claim 4, wherein said interconnect node associated with each said at least one coherency management node comprises termination detection circuitry configured, as each slot is received by that interconnect node, to determine from a current value of the snoop response count indication whether all responses for the corresponding snoop request have been received, and if so to route the snoop response information in that slot to the associated coherency management node.

7. A data processing apparatus as claimed in claim 6, wherein said interconnect node associated with each said at least one coherency management node comprises initial snoop response count indication setting circuitry configured, for each issued snoop request, to set an initial value for the snoop response count indication in each of said at least one slots identified by said identifier for the transmission of the snoop responses for said snoop request.

8. A data processing apparatus as claimed in claim 7, wherein said initial snoop response count indication setting circuitry sets the initial snoop response count indication having regard to a number of caching nodes targeted by the snoop request.

9. A data processing apparatus as claimed in claim 4, wherein said count indication circuitry comprises an LFSR incrementer circuit configured to modify the snoop response count indication as the slot passes from a current interconnect node to an adjacent interconnect node within said at least one ring if the merging circuitry of the current interconnect node has merged a snoop response into said slot.

10. A data processing apparatus as claimed in claim 4, wherein the snoop request is broadcast to all of said caching nodes.

11. A data processing apparatus as claimed in claim 4, wherein the snoop request is broadcast to all of said caching nodes other than a caching node causing said snoop request to be issued.

12. A data processing apparatus as claimed in claim 4, wherein the presence of said coherency condition is detected by at least one of receipt by the at least one coherency management node of an access request from one of said caching nodes, or occurrence of a cache maintenance operation.

13. A data processing apparatus comprising:
an interconnect having a plurality of interconnect nodes arranged to provide at least one ring;
a plurality of caching nodes, each caching node being configured to cache data and being coupled into the interconnect via an associated one of said interconnect nodes;
at least one coherency management node for implementing a coherency protocol to manage coherency of the data cached by each of said caching nodes, each coherency management node being coupled into the interconnect via an associated one of said interconnect nodes;
said at least one ring providing a plurality of slots for transmission of information around said at least one ring, within each said at least one ring the slots provided for that ring being passed sequentially between said plurality of interconnect nodes;

the at least one coherency management node being configured in response to detection of a coherency condition, to issue a snoop request to at least a subset of said plurality of caching nodes, the snoop request having an identifier which identifies at least one slot of said plurality of slots to be used to transmit snoop responses for that snoop request;

when each caching node in said at least a subset produces a snoop response for said snoop request, the associated interconnect node being configured to output that snoop response in one of said at least one identified slots; and each interconnect node associated with a caching node having merging circuitry configured, when outputting the snoop response in one of said at least one identified slots, to merge that snoop response with any current snoop response information held in that slot, wherein the snoop response information maintained in the identified slot comprises a plurality of flags, and said merging circuitry is configured to perform a logical OR operation in order to update the flags of the current snoop response information held in the identified slot to incorporate the snoop response produced by the associated caching node.

14. A data processing apparatus as claimed in claim 13, wherein each flag comprises a plurality of fields, each field corresponding to a different caching node, and the merging circuitry performs said logical OR operation in order to update the relevant field of each flag within the snoop response information held in the identified slot.

15. An interconnect structure for coupling a plurality of caching nodes used to cache data with at least one coherency management node implementing a coherency protocol to manage coherency of the data cached by each of said caching nodes, the interconnect structure comprising:

a plurality of interconnect nodes arranged to provide at least one ring, each interconnect node for coupling to one of said caching nodes or to one of said at least one coherency management nodes;

said at least one ring providing a plurality of slots for transmission of information around said at least one ring, within each said at least one ring the slots provided for that ring being passed sequentially between said plurality of interconnect nodes, in response to detection of a coherency condition, said at least one coherency management node issuing a snoop request to at least a subset of said plurality of caching nodes, the snoop request having an identifier which identifies at least one slot of said plurality of slots to be used to transmit snoop responses for that snoop request;

when each caching node in said at least a subset produces a snoop response for said snoop request, the associated interconnect node being configured to output that snoop response in one of said at least one identified slots; and each interconnect node associated with a caching node having merging circuitry configured, when outputting the snoop response in one of said at least one identified slots, to merge that snoop response with any current snoop response information held in that slot wherein:

each slot has an associated snoop response count indication; and each interconnect node associated with a caching node includes count indication circuitry configured, when the merging circuitry outputs said snoop response in one of said at least one identified slots, to modify said associated snoop response count indication.

16. A method of coupling a plurality of caching nodes used to cache data with at least one coherency management node implementing a coherency protocol to manage coherency of the data cached by each of said caching nodes, the method comprising:

providing an interconnect having a plurality of interconnect nodes arranged to provide at least one ring;

coupling each caching node into the interconnect via an associated one of said interconnect nodes;

coupling each coherency management node into the interconnect via an associated one of said interconnect nodes;

providing said at least one ring with a plurality of slots for transmission of information around said at least one ring, within each said at least one ring the slots provided for that ring being passed sequentially between said plurality of interconnect nodes;

in response to detection of a coherency condition, issuing from said at least one coherency management node a snoop request to at least a subset of said plurality of caching nodes, the snoop request having an identifier which identifies at least one slot of said plurality of slots to be used to transmit snoop responses for that snoop request;

when each caching node in said at least a subset produces a snoop response for said snoop request, employing the associated interconnect node to output that snoop response in one of said at least one identified slots; and when outputting the snoop response in one of said at least one identified slots, merging that snoop response with any current snoop response information held in that slot;

providing each slot with an associated snoop response count indication; and at each interconnect node associated with a caching node modifying said associated snoop response count indication when outputting said snoop response in one of said at least one identified slots.

17. A data processing apparatus comprising:

interconnect means having a plurality of interconnect node means for providing at least one ring;

a plurality of caching node means, each caching node means for caching data and being coupled into the interconnect means via an associated one of said interconnect node means;

at least one coherency management node means for implementing a coherency protocol to manage coherency of the data cached by each of said caching node means, each coherency management node means being coupled into the interconnect means via an associated one of said interconnect node means;

said at least one ring providing a plurality of slots for transmission of information around said at least one ring, within each said at least one ring the slots provided for that ring being passed sequentially between said plurality of interconnect node means;

the at least one coherency management node means for issuing, in response to detection of a coherency condition, a snoop request to at least a subset of said plurality of caching node means, the snoop request having an identifier which identifies at least one slot of said plurality of slots to be used to transmit snoop responses for that snoop request;

when each caching node means in said at least a subset produces a snoop response for said snoop request, the associated interconnect node means for outputting that snoop response in one of said at least one identified slots; and each interconnect node means associated with a caching node means having merging means for merging, when outputting the snoop response in one of said at least one identified slots, that snoop response with any current snoop response information held in that slot, wherein:

each slot has an associated snoop response count indication; and each interconnect node means associated with a caching node means includes count indication means for modifying said associated snoop response count indication when the merging means outputs said snoop response in one of said at least one identified slots.

* * * * *